United States Patent [19]

Hino et al.

[11] Patent Number: 4,998,216
[45] Date of Patent: Mar. 5, 1991

[54] DATA PROCESSING SYSTEM

[75] Inventors: Rika Hino, Tokyo; Kimio Osawa, Kanagawa, both of Japan

[73] Assignee: Kabushiki Kaisha Toshiba, Kawasaki, Japan

[21] Appl. No.: 413,394

[22] Filed: Sep. 27, 1989

[30] Foreign Application Priority Data

Oct. 24, 1988 [JP] Japan .................................. 63-267503

[51] Int. Cl.$^5$ ............................................. G06K 15/00
[52] U.S. Cl. ........................................ 364/519; 271/9
[58] Field of Search ................... 271/9; 364/518-520, 364/235, 930; 355/314, 308, 309, 311; 400/578, 582

[56] References Cited

U.S. PATENT DOCUMENTS 4,647,950 3/1987 Nosaki et al. ...................... 346/160
4,786,920 11/1988 Igarashi .................................. 271/9
4,871,160 10/1989 Yoshino ................................. 271/9

Primary Examiner—Arthur G. Evans
Attorney, Agent, or Firm—Foley & Lardner, Schwartz, Jeffery, Schwaab, Mack, Blumenthal & Evans

[57] ABSTRACT

A laser printer which uses a laser-diode is a peripheral device for a host machine which processes information. The laser printer is a slave of the host machine such that the laser printer forms an image on a paper only as the host machine commands. The laser printer includes a cassette for automatic paper feeding. The laser printer receives data and commands to print the data in a specified format on a paper of a size selected by the host machine. Furthermore, the laser printer includes a manual feeding unit to feed paper to an image forming position. The manual feeding unit includes a sensor for detecting when a paper sheet is inserted into the manual feeding unit. When the sensor detects the paper sheet, the laser printer forms the image on the paper sheet fed by the manual feeding unit in spite of the command from the host machine.

6 Claims, 24 Drawing Sheets

DATA PROCESSING SYSTEM

BACKGROUND OF THE INVENTION

1. Field of the Invention

The present invention relates to a data processing system, especially a data processing system comprising a computer and an output machine for the computer.

2. Description of the Prior Art

A laser printer is used as an output machine for a personal computer or a lap top computer (hereafter referred to as host machine. The laser printer is slave to the host machine. This is because the laser printer records a data or an image on paper as the host machine orders.

For example, the laser printer which is disclosed in the U.S. Pat. No. 4,647,950 records on paper of a size designated by the host machine. The prior art laser printer is permitted to record the data on manually fed paper if an operator gives the laser printer the information about the manually fed paper. When various sheet materials are used in the laser printer the operator must operate a plurality of switches to give the instructions.

SUMMARY OF THE INVENTION

Accordingly, it is an object of the present invention to provide a data processing system in which various kinds of sheet material are used more easily.

In accordance with the present invention, the foregoing object, among others, is achieved by providing a data processing system for producing a visible image of an image forming medium, comprising host computer means for processing data and generating signals corresponding to an image to be formed; and image forming means responsive to the host computer means for forming the visible image on the image forming medium, including means for automatically supplying an image forming medium from a supply thereof; alternative means for manually supplying an image forming medium; and overide means responsive to the manual supply means for automatically deactivating the automatic supply means when the image forming medium is manually supplied.

Other objects, features, and advantages of the present invention will become apparent from the following detailed description. It should be understood, however, that the detailed description and specific examples while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference characters designate the same or similar parts throughout the figures thereof and wherein.

DESCRIPTION OF THE PREFERRED EMBODIMENTS

Figure 1:
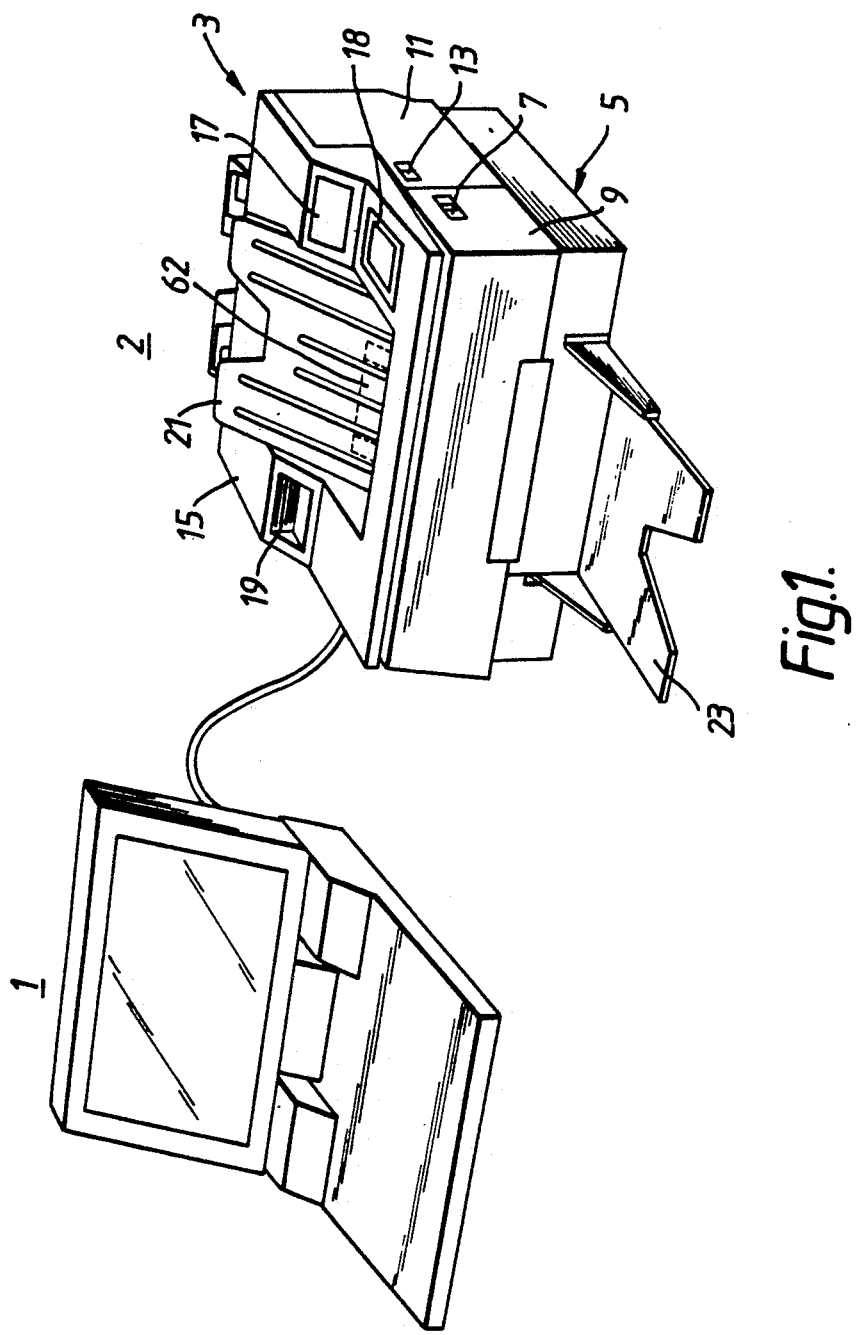
FIG. 1 is a perspective view of a data processing system including a host machine and a laser printer according to the present invention.

Referring now to the drawings, like reference characters designate identical or corresponding parts throughout the several views.

As shown in FIG. 1, a data processing system comprises a host computer, such as a host machine 1, and an image forming apparatus, such as a laser printer 2 which is connected to host machine 1. Host machine 1 processes data and generates signals corresponding to an image. Laser printer 2 transforms the signals from host machine 1 into signals suitable for forming the image and forms the image.

The body of laser printer 2 is divided into an upper unit 3 and a lower unit 5. Upper unit 3 is manually lifted up away from lower unit 5 after a first lever 7 is moved. First lever 7 is provided on a right-side cover 9, which covers a front portion of the right side of upper unit 3. The rear portion is covered with a right-side door 11, which is opened by a second lever 13.

The rear portion 15 of the top of upper unit 3 protrudes. The top of upper unit 3 has a difference in height. The difference in height provides two slanting surfaces on the top of upper unit 3. On a right slanting surface there is provided a display 17 including a sixteen digit liquid crystal display (hereafter referred to as. LCD). On a lower surface of the top of upper unit 3 is deposited a key section 18 with a plurality of keys to input a plurality of instructions into laser printer 3. On the left slanting surface there is an IC card insertion section 19 which accomodates three IC cards.

Between display 17 and IC card insertion section 19, there is a first receiving tray 21 which receives a paper sheet on which an image is to be made. The laser printer 2 discharges the sheets not only onto first receiving tray 21, but also onto a second receiving tray 23, which is provided at the front cover of lower unit 5.

Figure 2:
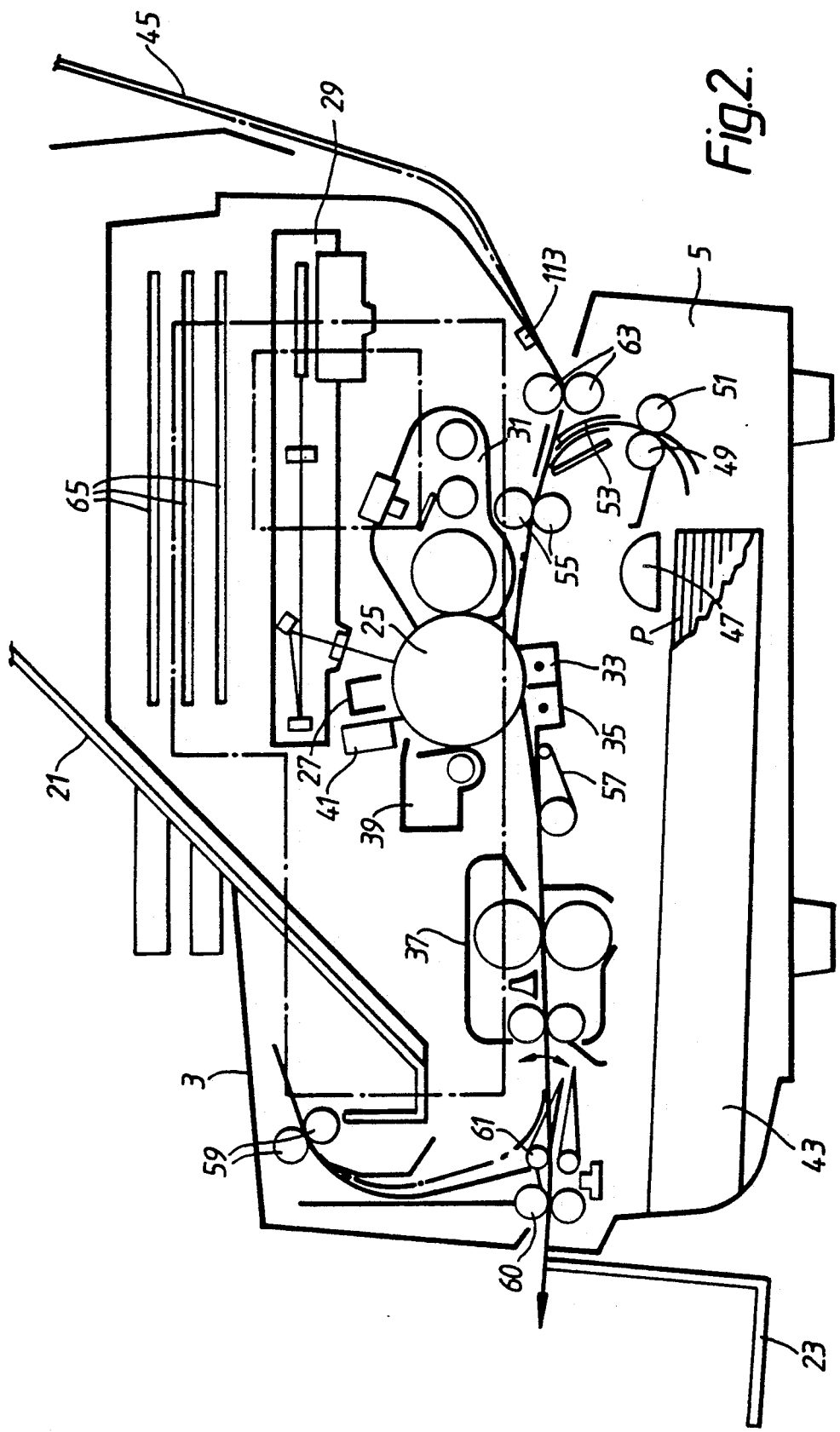
FIG. 2 is a sectional view of the laser printer shown in FIG. 1.

Referring now to FIG. 2, the inside structure of laser printer 1 is as follows:

A photosensitive drum 25 is located at the center of the body of laser printer 2. The surface of photosensitive drum 25 is covered with a photosensitive layer which forms a latent image by an exposure.

The surface of photosensitive drum 25 is charged uniformly by a main charger 27. Main charger 27 applies minus seven hundred volts to photosensitive drum 25. The charged surface of photosensitive drum 25 is exposed by a laser exposure unit 29 so that the latent image appears on the surface of photosensitive drum 25.

Laser exposure unit 29 includes a semiconductor laser as a source of a light beam. The light beam is scanned by a rotatable octagonal-face mirror (shown in FIG. 12) and a plurality of plane mirrors (not shown).

The latent image formed by the laser beam is developed by a developing unit 31. Developing unit 31 applies a toner to the surface of photosensitive drum 25 so that the latent image converts into a toner image.

The toner image is transferred from the surface of photosensitive drum 25 to a paper sheet by a transfer unit 33. The paper sheet with the toner image is separated from the surface of photosensitive drum 25 by a separating unit 35. Separating unit 35 applies an alternating field of 500 Hz to the paper sheet attached to photosensitive drum 25 so that the paper sheet is separated.

The toner image on the paper sheet is fixed by a fixing unit 37. Fixing unit 37 applies heat and pressure to the paper sheet.

After separating, the surface of photosensitive drum 25 is cleaned by a cleaning unit 39. Cleaning unit 39 forcibly scrapes off any toner remaining on the surface of photosensitive drum 25.

A discharging unit 41 erases any charge remaining on the surface of photosensitive drum 25 after the cleaning of residual toner. Discharging unit 41 includes a lamp to irradiate the surface of photosensitive drum 25 so that the surface of photosensitive drum 25 is returned to its initial state.

The delivery of the paper sheet is as follows.

The paper sheet is supplied between photosensitive drum 25 and transferring unit 33 from a cassette 43 or a manual feeding unit 45. In the present embodiment, the laser printer has two modes for feeding paper sheets. One mode is a cassette feeding mode using cassette 43. The mode is a manual feeding mode using manual feeding unit 45.

Cassette 43, which is located at the bottom of lower unit 5, accommodates a plurality of the paper sheets. The paper sheet of cassette 43 is picked up by a supply roller 47. Supply roller 47 is located over the edge of cassette 43. The section of supply roller 47 is shaped like a half moon. The curved surface of supply roller 47 is permitted to contact the top of the paper sheet in cassette 43, which includes a spring (not shown) to push the paper sheets toward supply roller 47. The flat surface of supply roller 47 fails to contact with the portion of the paper sheet in cassett 43.

Supply roller 47 is rotated by a motor (not shown) to contact with the paper sheet through the curved surface of supply roller 47.

The paper sheet picked up by supply roller 47 is fed between a U-turn roller 49 and a back-up roller 51. The motor (not shown) rotates U-turn roller 49, but not back-up roller 51. This conveys the paper sheet from cassette 43 toward photosensitive drum 25 through back-up roller 51, a guide plate 53 and a pair of aligning rollers 55.

The path from supply roller 47 to aligning rollers 55 is a U-turn path which makes the body of laser printer 2 smaller. The U-turn path leads to photosensitive drum 25. A path continues from photosensitive drum 25 to first receiving tray 21. Along the path the paper sheets go through a belt 57, fixing unit 37 and a pair of first exit rollers 59. Belt 57 which is located between separating unit 35 and fixing unit 37 conveys the paper sheet separated from photosensitive drum 25. The path from fixing unit 37 to exit rollers 59 curves upwardly.

Another path is provided from fixing unit 37 to second receiving tray 23. These two paths from fixing unit 37 to first and second receiving tray 23 are separated by a selector 61, which moves up or down so that selector permits the paper sheet to go to one of receiving trays 21 and 23. The paper sheet which is guided by down selector 61 is discharged by a pair of second exit rollers 60 onto second receiving tray 23.

There is provided an another path to photosensitive drum 25. The path comes from manual feeding unit 45.

Manual feeding unit 45, which is located at the rear cover of upper unit 3, includes a plate to guide the paper sheet into body of laser printer 2. The paper sheet inserted into manual feeding unit 45 reaches a pair of manual-feed rollers 63 and is held by the pair of manual-feed rollers 63. The upper roller of manual-feed rollers 63 is rotated to feed the paper sheet toward the aligning rollers 55.

The elements described above are controlled by a controller, which is located on a plurality of PC boards 65.

Figure 3:
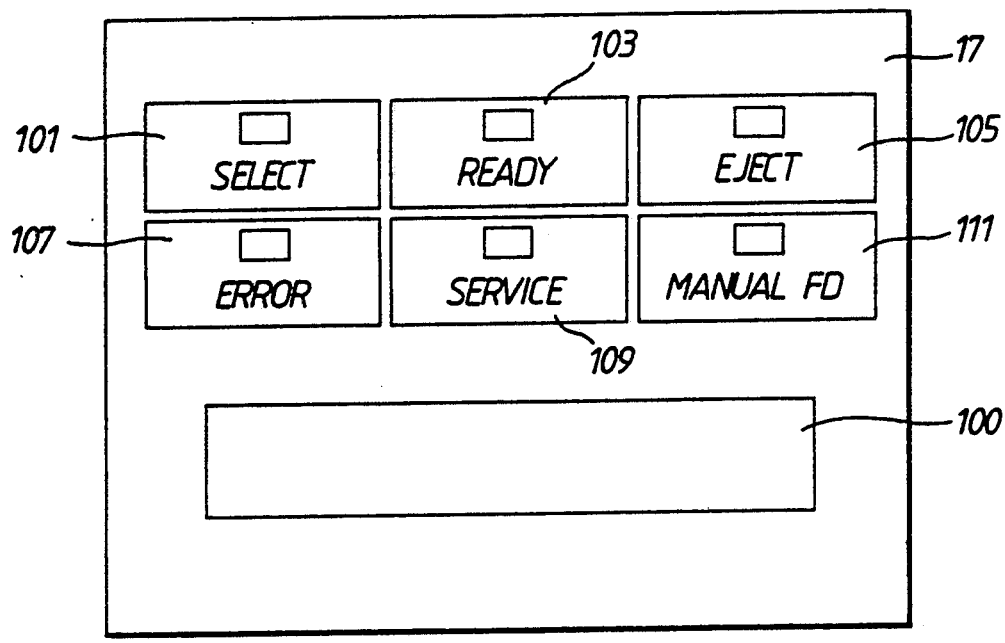
FIG. 3 is a plan view of a display of the laser printer shown in FIG. 1.

Referring now to FIG. 3, display 17 has an LCD display 100 and six LEDs (light-emitting diode) including a select LED 101, a ready LED 103, an eject LED 105, an error LED 107, a service LED 109 and a manual-feed LED 111. These LEDs 101, 103, 105, 107, 109, and 111 are covered with plastic material on which the names of these LED are written.

The operation of select LED 101 is as follows:

When select LED 101 is turned on, select LED 101 indicates that laser printer 2 is in a select state. After a warm-up period of laser printer 2, select LED 101 is on when laser printer 2 is ready.

When select LED 101 is on, laser printer 2 is permitted to accept a plurality commands from host machine 1. When select LED 101 is turned off, LED 101 indicates that laser printer 2 is in a deselect state.

If any of the malfunction situations corresponding to "Operator call" or "Service call" condition occurs, select LED 101 goes off. When laser printer 2 is in the deselect state, laser printer 2 is incapable of communicating with host machine 1. Only local operations, such as buffer dumping, or test printing are possible.

The operation of ready LED 103 is as follows:

When ready LED 103 is made to flash, ready LED 103 indicates that laser printer 2 is in the warm-up period. Simultaneously the message "WAIT" is displayed in LCD displays 100. When ready LED 103 is turned on, ready LED 103 indicates that laser printer 2 is ready. When ready LED 103 is turned off, ready LED 103 indicates that the malfunction condition occurs and the corresponding error message is displayed in LCD display 100.

The operation of eject LED 105 is as follows:

When eject LED 105 is turned on, eject LED 105 indicates the condition of a buffer in the control system as (a) Host machine 1 sends an "end of page" or "job finished flag" to laser printer 2.

(b) An eject key 112 on key section 18 is pushed.

Eject key 112 and the buffer are described later.

When eject LED 105 is turned off, eject LED 105 indicates that the buffer fails to contain any information.

The operation of error LED 107 is as follows:

When error LED 107 flashes, error LED 107 indicates that laser printer 2 is in a warning condition requiring an operator call.

The warning condition is:

(a) When developer unit 31 has almost reached the end of its life cycle, which is forty thousand copies.

During this warning period, LCD display 100 shows the corresponding message "CHANGE DEVELOPER".

(b) When photosensitive drum 25 has almost reached the end of it life cycle, which is ten thousand copies.

During this warning period, LCD display 100 shows the corresponding message "CHANGE DRUM":

(c) When fixing unit 37 has almost reached the end of its life cycle, which is eighty thousand copies.

During this warning period, LCD display 100 shows the corresponding message "CHANGE FUSER"

In these conditions, laser printer 2 is still permitted to form the image, but for only a limited number of sheets, during the warning period. The limited number is one thousand sheets in the present embodiment.

When error LED 107 is turned on, error LED 107 indicates that the operator call conditions have occurred in laser printer 2. When error LED 107 is turned off, error LED 107 indicates that an operator call problem has been fixed. When error LED 107 is turned on, the corresponding error message is shown on LCD display 100 as TABLE 1.

The operation of service LED 109 is as follows:

When service LED 109 turns on, service LED 109 indicates that conditions to require a service call have occurred in laser printer 2. When service LED 109 turns off, service LED 109 indicated that the power of laser printer 2 is turned off. When service LED 109 turns on, the corresponding error messages are shown on LCD display 100 as TABLE 2.

The operation of manual FD LED 111 is as follows:

When manual FD LED 111 is turned on, manual FD LED 111 indicates that the manual feeding mode is activated and laser printer 2 waits until the paper sheet is inserted into manual feeding unit 45.

TABLE 1

| "Operator call" (Error) | 16-digit LCD 0123456789ABCDEF |
|---|---|
| 1. Paper feeding jam conditions | |
| (a) Cassette feeding jam (main cassette) | JAM - MAIN CAS |
| (b) Option feeding jam (upper cassette) | JAM - UPPER CAS |
| (c) Option feeding jam (lower cassette) | JAM - LOWER CAS |
| (d) Exit feeding jam | JAM - EXIT FEED |
| (e) Manual feeding jam | JAM - MANUAL FD |
| (f) Envelope feeding jam | JAM - ENV FEED |
| 2. Add toner | ADD TONER |
| 3. Add paper | ADD TONER |
| (a) Main cassette paper empty | PAPER OUT-MAIN |
| (b) Optional upper cassette paper empty | PAPER OUT-UPPER |
| (c) Optional lower cassette paper empty | PAPER OUT-LOWER |
| (d) Manual feeding paper empty | PAPER OUT-MANUAL |
| (e) envelope feeder paper empty | PAPER OUT-ENVLOP |
| 4. Change developer | CHANGE DEVELOPER |
| 5. Change drum | CHANGE DRUM |
| 6. Change fuser unit | CHANGE FUSER |
| 7. Stacker full | STACKER FULL |
| 8. Cover open | COVER OPEN |
| 9. Developer not installed properly | DEV NOT INSTALLD |
| 10. Drum not installed properly | DRUM NOT INSTLLD |
| 11. Fuser not installed properly | FUSR NOT INSTLLD |
| 12. Main cassette not installed | NO MAIN CASSETTE |
| 13. Upper cassette not installed | NO UPPR CASSETTE |
| 14. Lower cassette not installed | NO LOWR CASSETTE |
| 15. New developer cartridge error | NEW DEV BAD |
| 16. Main charger not installed properly | CHECK MN CHARGER |
| 17. Developer over toner | DEV OVER-TONED |

TABLE 2

| "Service call" | 16-digit LCD 0123456789ABCDEF |
|---|---|
| 1. Laser trouble | LASER PROBLEM |
| 2. No beam detection | NO BEAM DETECT |
| 3. Scanner trouble | SCANNER PROBLEM |
| 4. Fuser unit trouble | FUSER PROBLEM |
| 5. Main motor trouble | MAIN MOTOR PRBLM |
| 6. Hardware trouble | HARDWARE PROBLEM |
| 7. I/F controller timing trouble | TIMING PROBLM |
| 8. I/F controller trouble | CONTROLLER PRBLM |
| 9. Envelope motor fault | ENV MOTOR PROBLM |
| 10. Jogger motor fault | JOG MOTOR PROBLM |
| 11. Gate fault | GATE PROBLM |
| 12. Multi-cassette feed motor fault | CASS FD MTR PRBM |
| 13. Multi-cassette aligning motor fault | CASS A-MTR PRBLM |
| 14. Recycle motor fault | RCYCL-MTR PROBLM |

Referring now to FIG. 2, manual-feeding unit 45 has a paper sensor 113 in order to detect the presence of the paper sheet in manual feeding unit 45. If there is no paper sheet in manual feeding unit 45, laser printer 2 is in an operator call status until:

(a) the paper is inserted in manual feeding unit 45, (b) the mode selection is changed into the cassette feeding mode and manual FD LED 111 goes off.

When manual FD LED 111 is turned off, manual FD LED indicates that laser printer 2 is in the cassette feeding mode. If cassette 43 is not inserted, error LED 107 is turned on and LCD display 100 shows the corresponding message, such as "PAPER OUT-MAIN".

When manual FD LED 111 is caused to flash, manual FD LED 111 indicates that the paper sheet has been inserted to override the selected cassette feeding mode. The next sheet to be fed to aligning rollers 55 is the manually inserted sheet. If the paper sheet is set in manual feeding unit 43 during paper feeding, a jam condition results.

Figure 4:
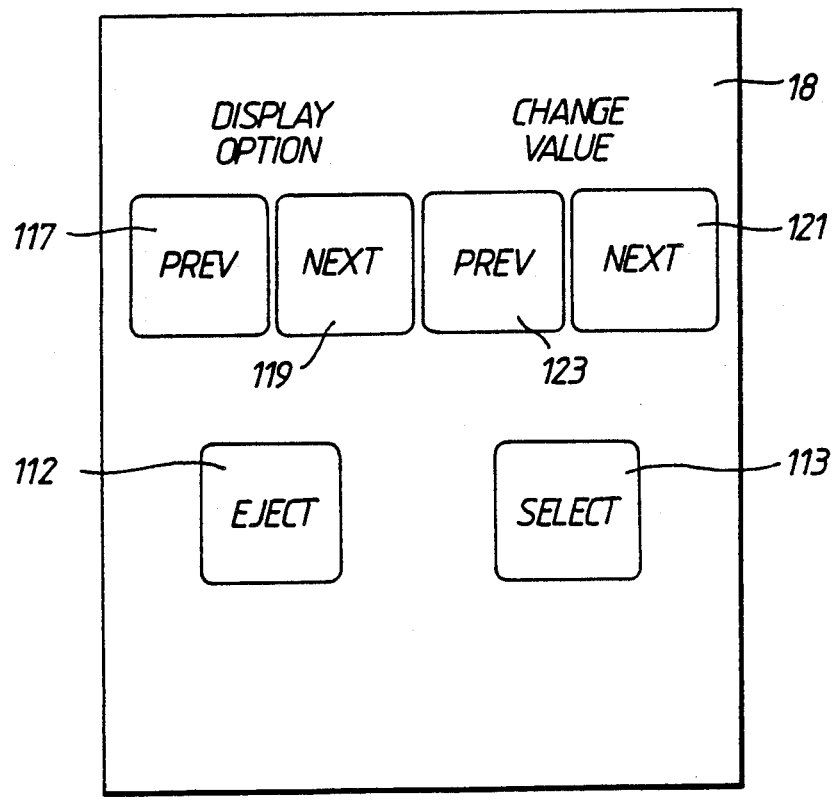
FIG. 4 is a plan view of a key section of the laser printer shown in FIG. 1.

Now referring to FIG. 4, key section 18 has a select key 113, eject key 112, a previous and a next keys 117 and 119 of display option, and a privious and a next key 121 and 123 of change value.

Select key 113 is used to change the state from the select state to the deselect state or from the deselect state to select state as described in the content of select LED 101. When select key 113 is turned on at the deselect state, a controller checks the internal flags. After laser printer 2 is ready, the select state is activated and select LED 101 comes on. When select key 113 is turned on at the select state, the deselect state is activated and select LED 101 goes off. The select/deselect condition is controlled by the commands from the controller. When select key 113 is turned on during a jam condition, the jam condition is cleared.

Eject key 112 is permitted to be used in the deselect state. If eject key 115 is pressed as eject LED 105 is on, the information in the buffer is printed and eject LED 105 then goes off when there is no more information in the buffer. If the buffer is empty in the first place, the controller simply does nothing, but displays the message "BUFFER EMPTY".

Previous and next keys 117 and 119 of display option are used to select the function menu in one of the modes, e.g. a test print mode, a maintenance mode, and a function set and so on. In the menu select state, the function menu is incremented by next key 117 and decremented by previous key 119. If each of next and previous key 117 and 119 is held longer than 1.5 seconds, then the function menu is incremented or decremented automatically at a rate of one function menu each 0.5 seconds (round robin) until respective key is released. The first time each of next and previous key is pressed, the selected menu is the last one previously selected. Previous and next keys of change value 121 and 123 are used to select the content of the menu.

When each of previous and next keys 121 and 123 is pressed the content of the menu is incremented by next key 121 and decremented by previous key 123. If each key 121 or 123 is held longer than 1.5 seconds, then the content of the menu is incremented or decremented automatically at a rate of one per 0.5 seconds (round robin) until the respective key is released.

Figure 5:
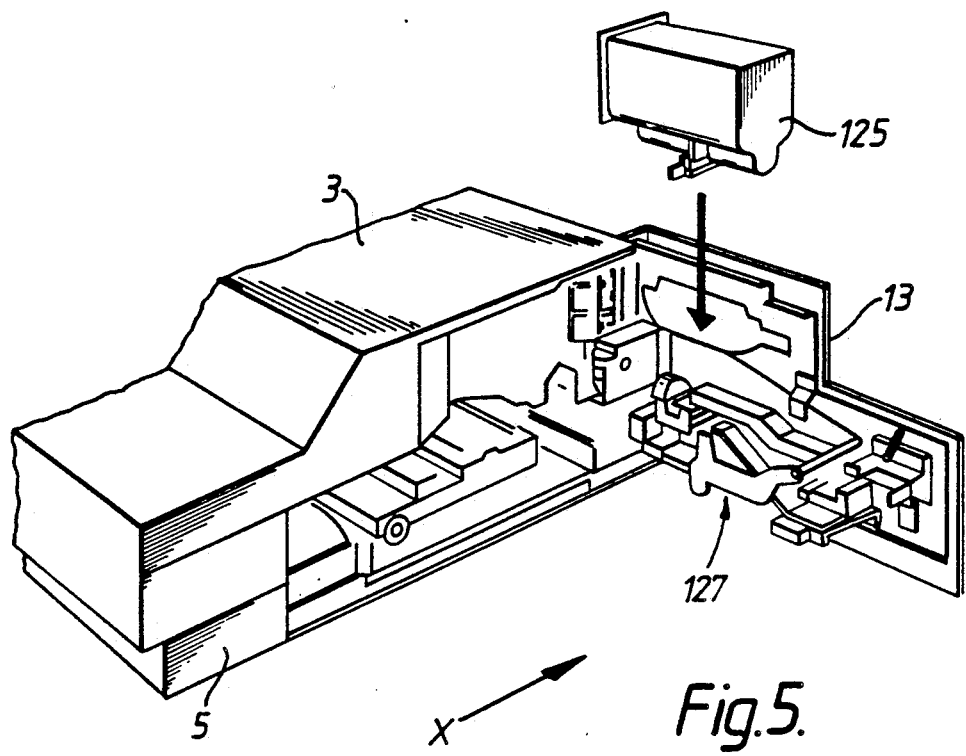
FIG. 5 is an perspective view of the laser printer with a right-side door open.
Figure 6:
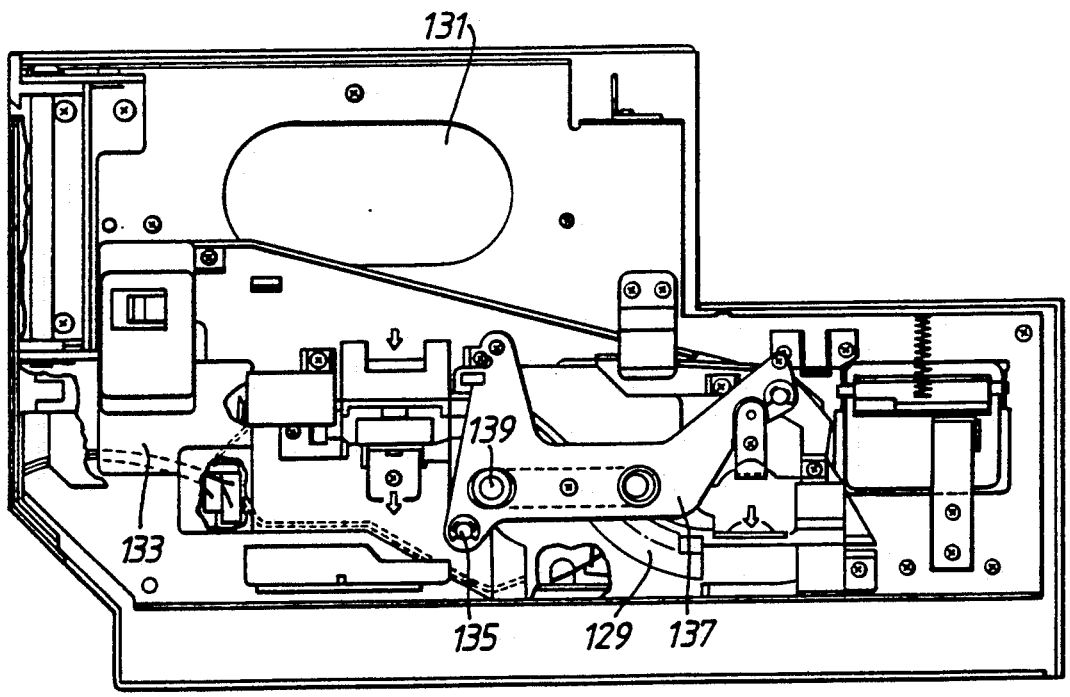
FIG. 6 is a front view of the right-side door in the direction of the arrow in FIG. 6.

As described above, right-side door 11 is opened by second lever 13. FIG. 5 shows a perspective view of laser printer 2 in which right-side door 11 is opened by using second lever 13. Right-side door 11 has a plurality of elements including a toner cartridge 125 and a recycle unit 127. Reterning to FIG. 6, recycle unit 127 includes a toner feeder section 129 which carries a toner from cleaning unit 39 to developing unit 31. Toner feeder section 129 has a duct including a first and second toner entrances A, B and a toner exit C. The relationship between developing unit 31, cleaning unit 39 and toner feeder section when right-side door is closed is as follows:

First toner entrance A faces an outlet of cleaning unit 39. Second toner entrance faces an outlet of toner cartridg 125. Toner exit C faces an inlet of developing unit 31. The duct includes a spiral to move a toner inside. Second toner entrance B and toner exit C is opened and closed by a shutter (not shown).

Toner cartridge 127 is held by a toner cartridge holder section 131 so that toner cartridge 127 is connected to recycle unit 129 through second toner entrance B.

The toner from cleaning unit 39 is delivered to toner exit C through the spiral driven by a recycle motor 133. The toner from leaning unit 39 and toner cartridge 127 is supplied to developing unit 31 through toner exit C.

A stud 135 holds a plate 137 with bushing 139. Stud 135 positions developing unit 31 and photosensitive drum 25 vertically by a positioning pin and horizontally by bushing 139.

Figure 7:
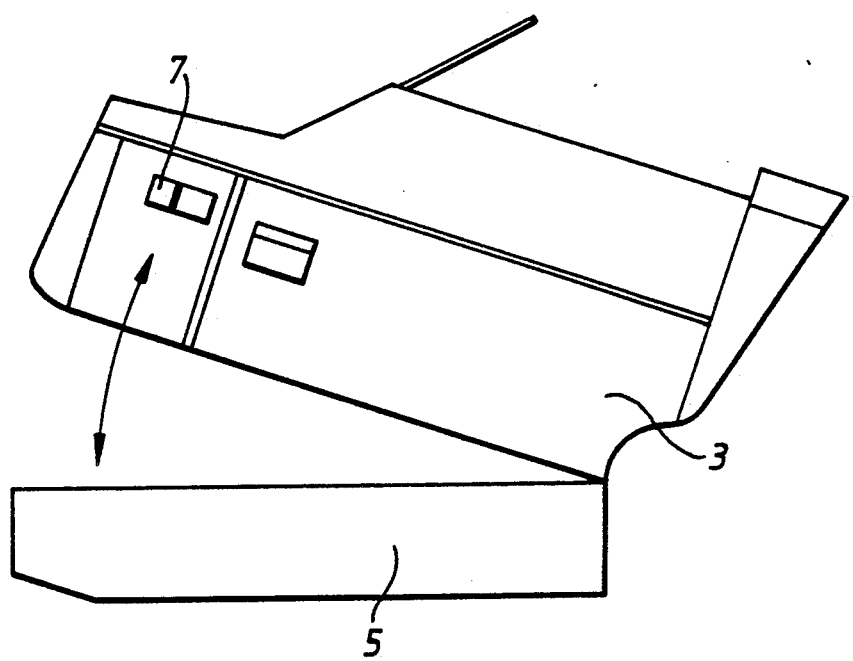
FIG. 7 is a side view of the laser printer when an upper portion of the laser printer is lifted up.

Referring to FIG. 7, upper unit 3 is lifted up by using first lever 7 so that upper unit 3 is separatable from lower unit 5. This structure is called a clamshell structure. Upper unit 3 includes photosensitive drum 25, main charger 27, laser exposure unit 29, developing unit 31, cleaning unit 39, upper roller of aligning rollers 55, upper roller of manual-feed rollers 63, exit roller 39, recycle unit 127 and PC boards 65. Furthermore upper unit 3 includes a main drive unit for driving photosensitive drum 25, developing unit 31 and cleaning unit 39 and so on.

Lower unit 5 includes transfer unit 33, separating unit 35, fixing unit 37, cassette 43, supply roller 47, U-turn roller 49, back-up roller 51, lower roller of aligning rollers 55, belt 57 and lower roller of manual-feed rollers 63. Furthermore lower unit 5 includes a drive unit for belt 57 and a power-supply unit not shown in FIG. 2.

When upper unit 3 is lifted up, there appears a path from manual-feed rollers 63 to second exit rollers 60.

Figure 8:
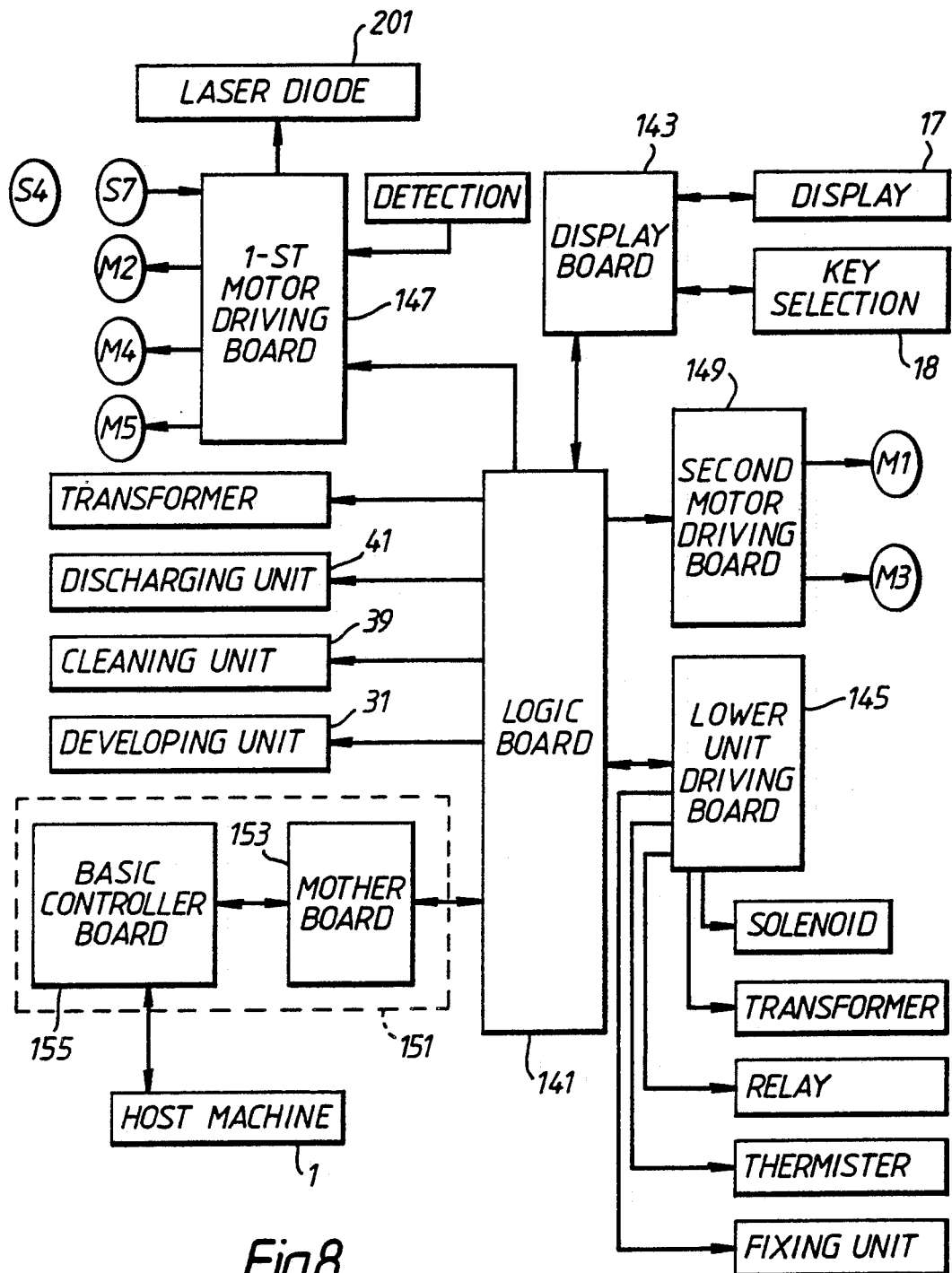
FIG. 8 is a block diagram of the laser printer shown in FIG. 1.

The electrical system contained in the present embodiment is as follows:

Referring to FIG. 8, the electrical system includes a logic board 141 which has a control CPU 8085AP. The control CPU controls processes to form the image, feed the paper sheet and fix the image. Furthermore the control CPU controls the interface between laser printer 2 and host machine 1 and the operation of the optical system, including the laser.

Logic board 141 is connected via a display board 143 to control display 17 and key section 18. Logic board 141 is connected to a lower unit driving unit 145 to drive a plurality of elements in lower unit 5 and to a first and second motor driving boards 147 and 149 to drive a plurality of motors M1 through M5. First motor driving board 147 includes an element for driving the laser-diode. Developing unit 31, cleaning unit 39 and discharging unit 41 are connected to logic board 141.

An interface unit 151, which is provided in laser printer 2, is connected to host machine 1 and logic board 141. Interface unit 151 includes a mother board 153 and a basic controller board 155, the details of which are described later. A power supply (not shown) is installed in lower unit 5 and supplies AC or DC power to a plurality of motors and boards in laser printer 2.

An outline of operation of the electrical system shown in FIG. 8 is as follows.

1. Processes Control

The process control includes the control of discharging, charging, exposing photosensitive drum 25, developing, transferring, and separating in the vicinity of photosensitive drum 25.

Figure 9:
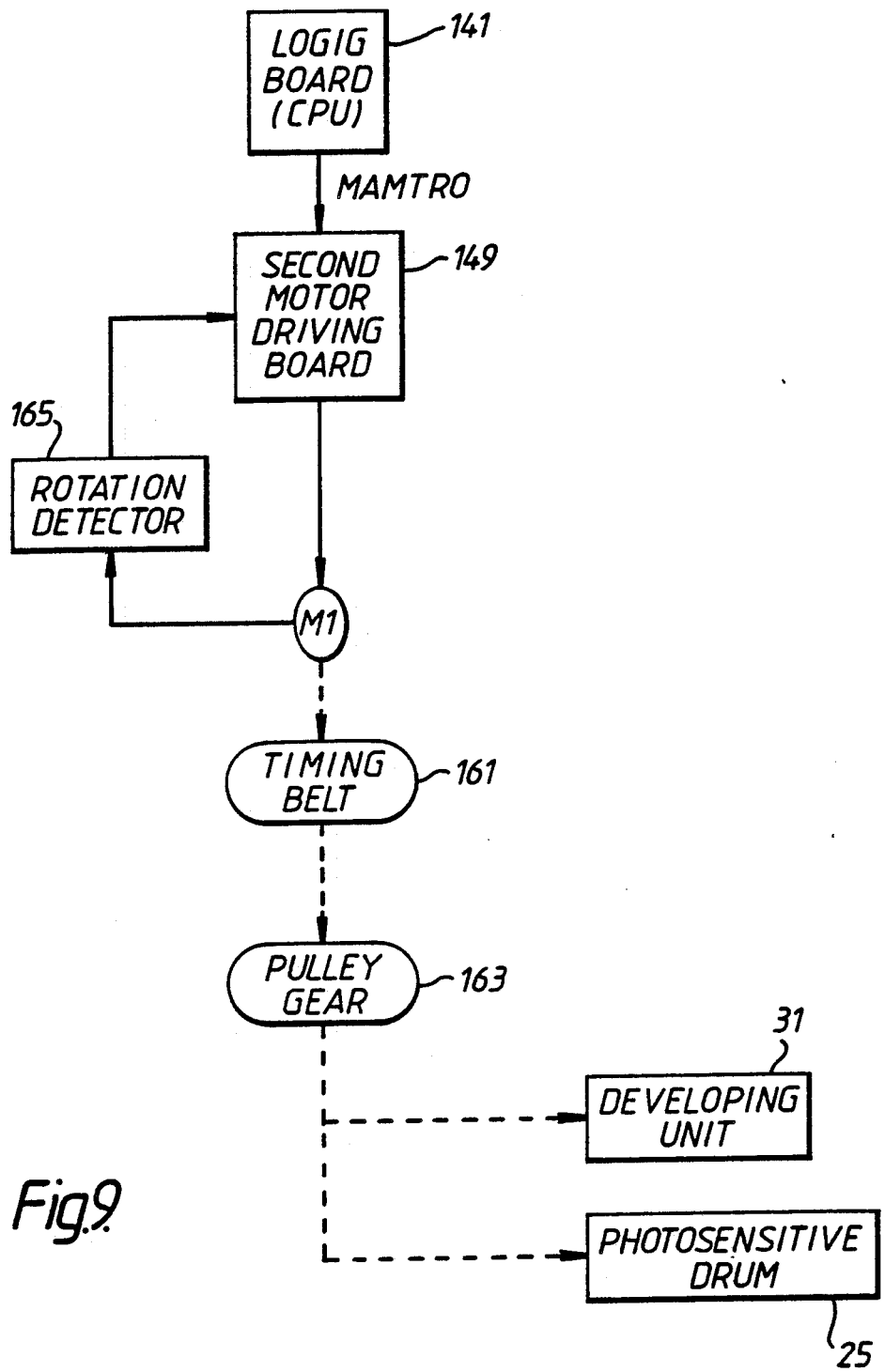
FIG. 9 is a block diagram of a process control system for driving a photosentive drum and a developing unit.

Referring to FIG. 9, photosensitive drum 25 and developing unit 31 are driven by a main motor M1 which is controlled by a CPU in logic board 141. At the designated time, the CPU sends a drive signal MAM- TRO to second motor driving board 149. Second motor driving board 149 supplies main motor M1 with a start signal.

Main motor M1 drives photosensitive drum 25 and developing unit 31 through a timing belt 161 and pulley gear 163. In FIG. 9, a line with an arrow indicates the signal flow. A dotted line with an arrow indicates a flow of force.

A rotation detector 165 detects the rotation of main motor M1 and sends a signal corresponding to the detected rotation to second motor driving board 149 which keeps the rotation of main motor M1 constant by using the signal from rotation detector 165.

2. Controlling System for Toner-Supply/Recovery

Figure 10:
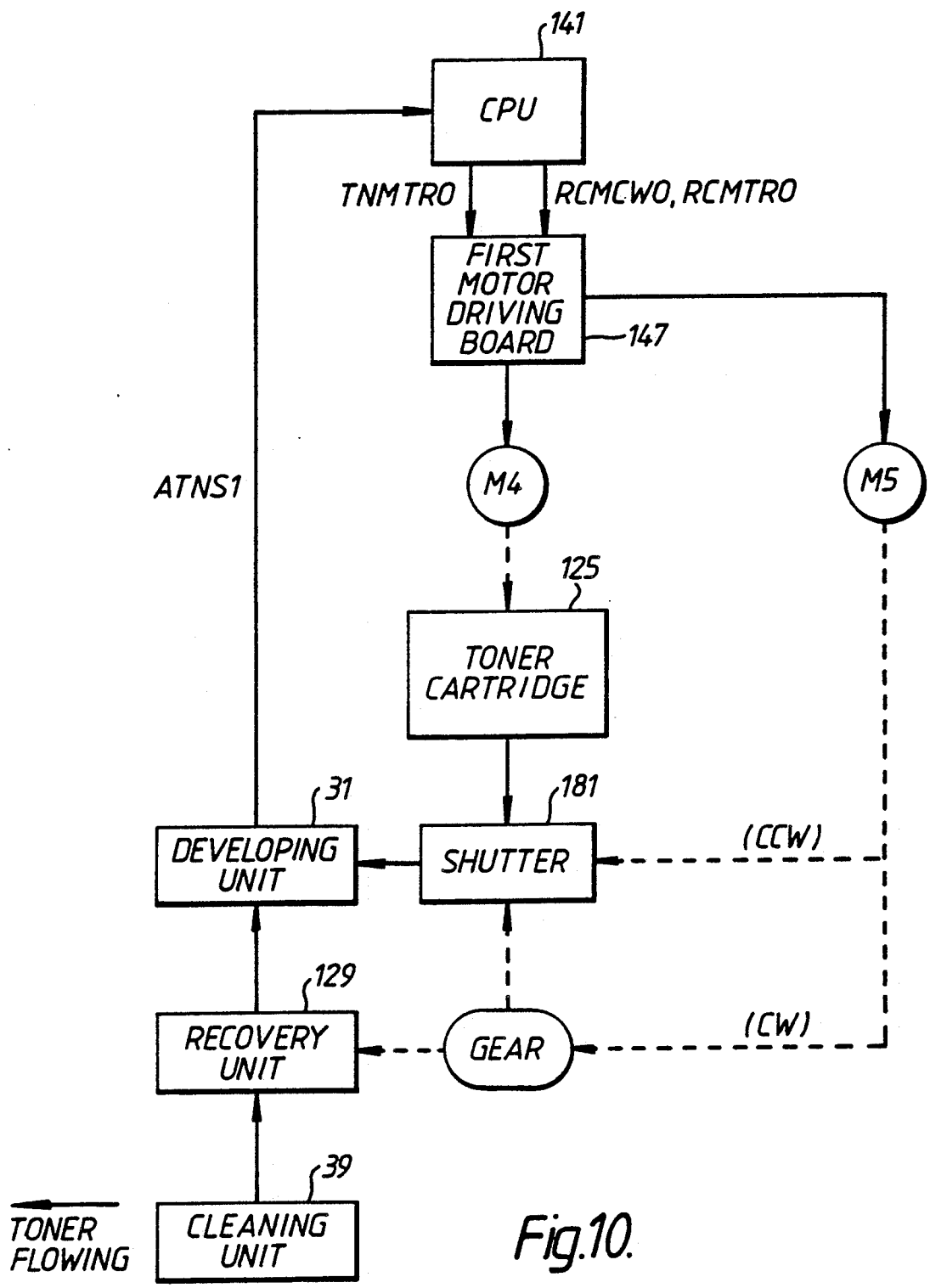
FIG. 10 is a block diagram of a controlling system for toner-supply/recovery shown in FIGS. 1 and 6.

Referring now to FIG. 10, logic board 141 including the CPU is connected to first motor driving board 147, which is connected to a toner motor M4 and a recycle motor M5. Toner motor M4 rotates a plurality of gears (not shown) which transmit the power to toner cartridge 125 so that toner in toner cartridge 125 is stirred.

As described above, toner cartridge 15 faces a second toner entrance B which is opened/closed by a shutter 181 to prevent toner leakage. Shutter 181 is opened when recycle motor M5 rotates clockwise (hereafter referred to as CW), and closed when recycle motor M5 rotates counter-clockwise (hereafter referred to as CCW). When shutter 181 is opened, toner is transferred from toner cartridge 125 and recovery unit 129 to developing unit 31.

When the CPU sends a TNMTRO signal to first motor driving board 147, toner motor M4 is rotated to supply the toner from toner cartridge 125 to developing unit 31. The starting/stopping of recycle motor M5 is controlled by a RCMTRO signal from the CPU in logic board 141. The direction of motor rotating is changed by a RCMCW signal.

When both of RCMTRO and RCMCWO signals are "L" level, recycle motor M5 rotates in the CW direction. When RCMTRO signal is "L" level and RCMCWO is "H" level, recycle motor M5 rotates in the CCW direction. Recycle Motor M5 rotates in the CW direction to recycle the toner, and rotates in the CCW direction to close shutter 181. In FIG. 10, a thick line with the arrow indicates a toner flowing.

3. Controlling System for Paper Feeding

Figure 11:
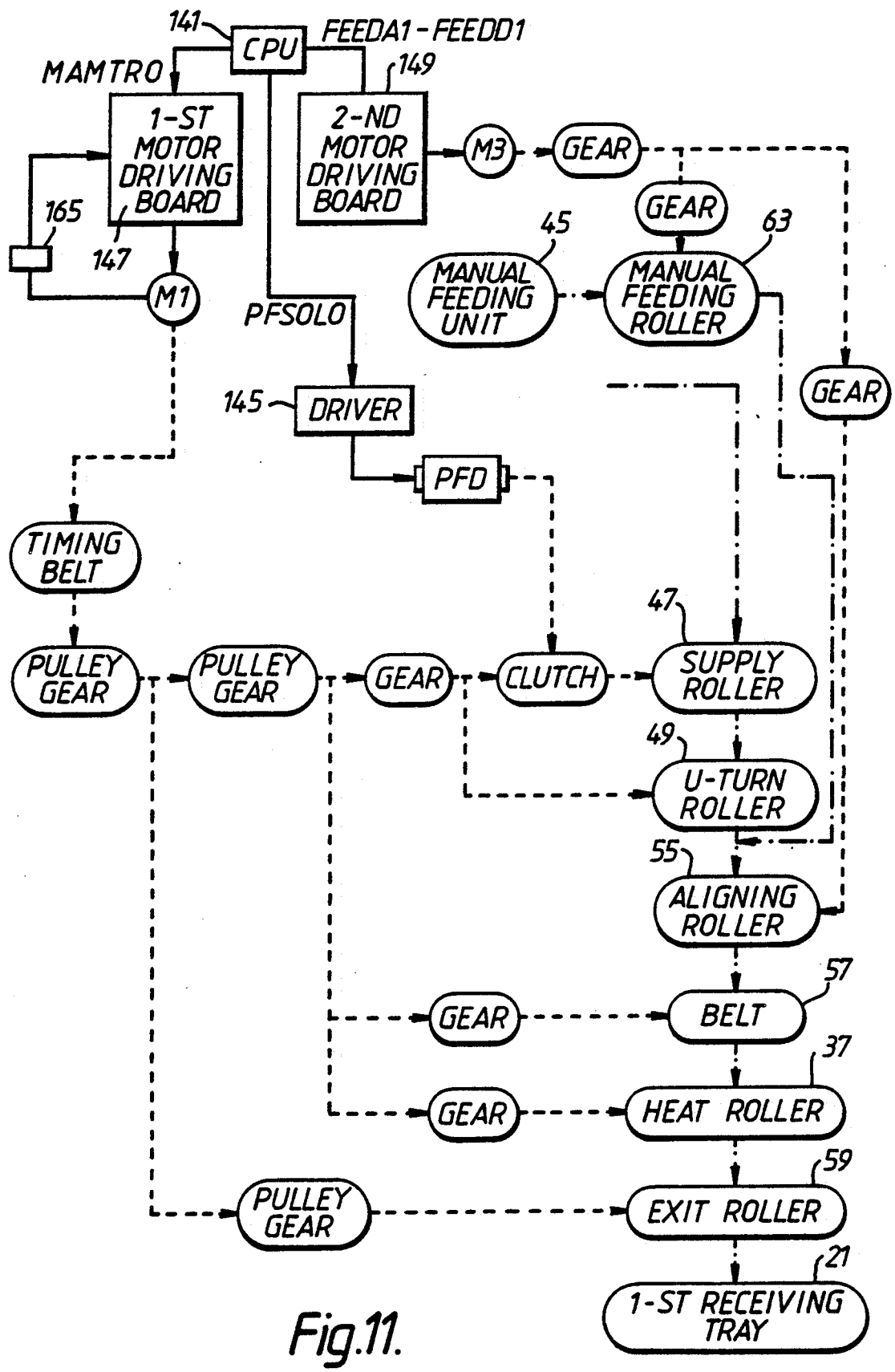
FIG. 11 is a block diagram of a controlling system for feeding paper.

Referring now to FIG. 11, the CPU in logic board 141 is connected to first and second motor driving boards 147 and 149. A feed motor M3 is controlled by second motor driving board 149. Feed motor M3 is connected to aligning roller 55 and manual feed roller 63 through a plurality of gears.

First motor driving board 147 controls a main motor M1 which drives supply roller 47, U-turn roller 49, belt 57, a heat roller in fixing unit 37 and exit roller 59 through a plurality of gears and so on. First motor driving board 147 is connected to a detector 165 which detects the difference between the real rotation speed and the standard rotation speed of main motor M1. In an automatic paper feeding mode, at first the CPU 141 sends a signal MAMTRO to first motor driving board 147, a signal PFSOLO to lower unit driving board 145 and a signal FEEDA1-FEEDD 1 to second motor driving board 149. Main motor M1 and feed motor M3 begin to rotate while being controlled by first and second motor driving boards 147 and 149. Main motor M1 is kept uniformly rotating by using the difference detected by detector 165.

Receiving the signal PFSOLO, lower unit driving board 145 makes a paper-feed solenoid PFD come on. The paper-feed solenoid PFD makes supply roller 47 and main motor M1 mechanically contact so that supply roller 47 begins to rotate to pick up the paper sheet in cassette 43.

Main motor M1 also drives U-turn roller 49 so that the paper sheet goes to aligning rollers 55 while being guided by guide plate 53. The paper sheet runs between aligning rollers 55 so that the leading edge of the paper sheet is aligned. After aligning the paper sheet, aligning rollers 55 are driven by main motor M3 so that the paper sheet is fed to belt 57 through a transferring point on photosensitive drum 25. Main motor M1 drives belt 57, heat roller in fixing unit 37 and exit-roller 59 so that the paper sheet with the image is discharged into first receiving tray 21.

In the manual paper feeding mode, the paper sheet is manually inserted into manual feeding unit 45. As described above, a detector to detect the paper sheet inserted into manual feeding unit 45 sends the CPU a signal indicating that the paper sheet is in manual feeding unit 45. The CPU sends second motor driving board 147 the FEEDA1-FEEDD1 signal. After receiving the FEEDA1-FEEDD1 signal, first motor driving board 147 controls main motor M1 to rotate in the CCW direction so that manual feed roller 63 is rotated by main motor M3. Neither supply roller 47 nor U-turn roller 49 is rotated. The paper sheet in manual feeding unit 45 is fed to aligning rollers 55. The paper sheet is discharged into first receiving tray 21 in the same manner from aligning roller 55 as in the automatic paper feeding mode.

4. Laser Scanning System

Figure 12:
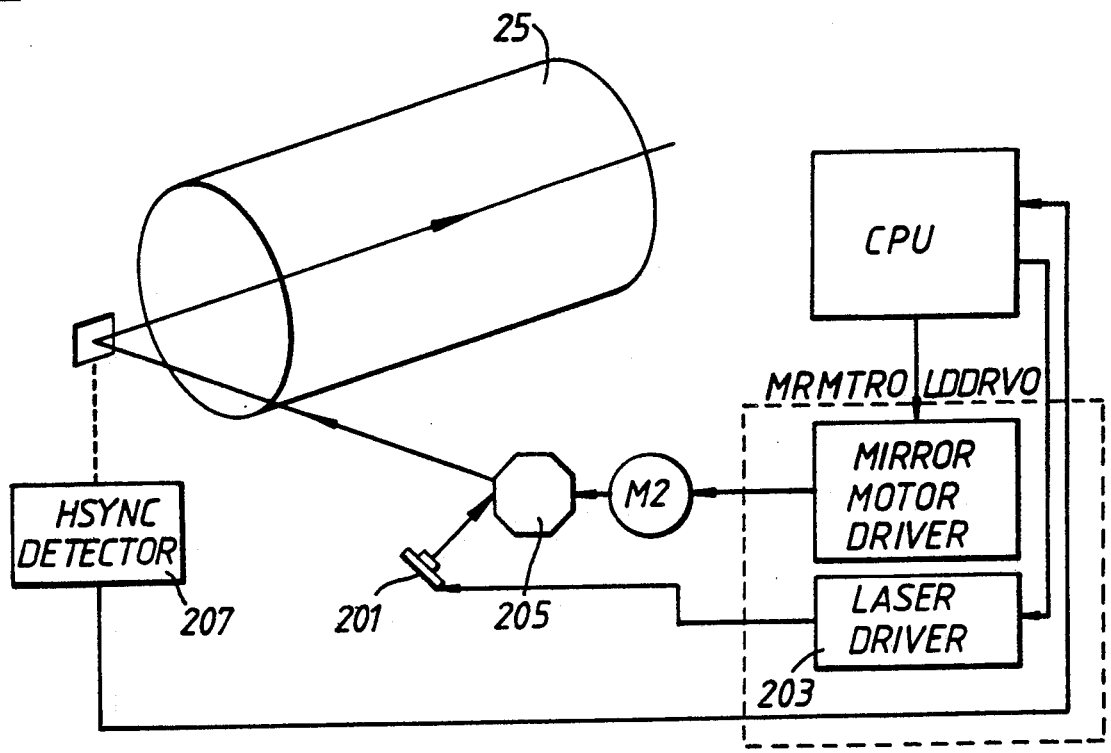
FIG. 12 is a block diagram of a laser scanning system.

Referring now to FIG. 12, a video signal from host machine 1 (shown in FIG. 1) is transmitted to a laser diode 201 to be used as the laser-diode drive signal LDDRVO. A laser driver 203 modulates a laser beam from laser diode 201, that is, switches laser diode 201 ON/OFF according to the "H"/"L" level of the video signal.

The modulated laser beam is reflected by the polygonal-faced mirror 205 rotating at high speed to irradiate photosensitive drum 25.

Polygonal-faced mirror 205 is rotated at high speed by a motor M2 which is controlled by MRMTRO signal from the CPU and the reflected laser beam irradiates photosensitive drum 25 creating one horizontal line on photosensitive drum 25. This horizontal line is scanned continuously using the laser scanning system including polygonal-faced mirror 205.

At this time, the irradiated laser beam at the start of the horizontal scanning is detected as the horizontal sync signal (hereafter referred to as HSYNC) by a HSYNC detector 207.

5. Interface Controller

An interface controller controls the operation of laser printer 2 and generates printing data by receiving the data from host machine 1. The interface controller updates to emulate the behavior of certain other printers. Such emulation causes laser printer 2 to print text and graphics in a form similar to the emulated printers. The present laser printer 2 is based upon the TOSHIBA DOT MATRIX PRINTER, P-351. The IBM graphics printer emulation and Diablo-630 emulation can be accessed simultaneously. Emulation means the process of using a printer to operate on data and code produced for a different printer. The interface controller includes two standard interfaces. One is a serial RS-232C interface and the other is a parallel interface. Eight channel RS-232C ports are added on an optional expansion board. The interface controller allows memory expansion by means of adding an optional expansion memory board. The optional expansion memory board adds a 1.5 Mbyte RAM and is used for full bit-mapped memory.

A maximum of three IC-cards may also be attached to the interface controller. The IC card is typically used as a plug-in font and for emulation purposes.

Figure 13:
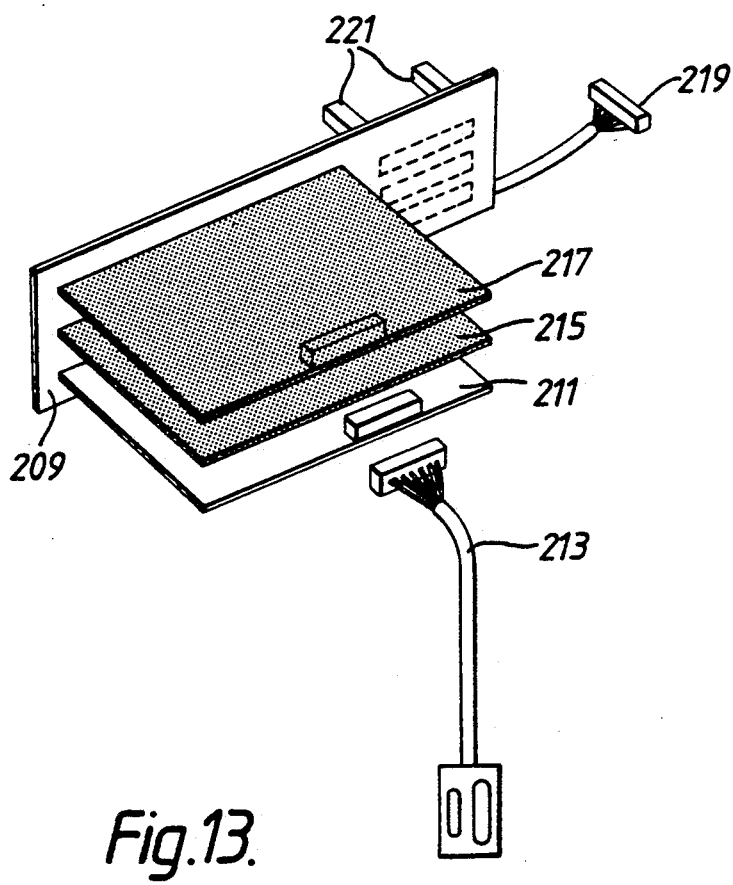
FIG. 13 is a perspective view of an interface controller used in the laser printer.

Referring to FIG. 13, the interface controller includes a mother board 209 to supply the power to other devices which are mounted on mother board 209, a basic controller board 211 and an I/O cable 213.

A memory expansion board 215 and a multi-RS 232C board 217 are added to mother board 209. Mother board 209 has a plurality of card conectors 221 through which a plurality of IC cards are connected to mother board 209.

Basic controller board 211 is the main portion of the interface controller and is connected to an engine interface of laser printer 2 through a connector 219. Basic controller board 211 is also connected to an interface (not shown) for host machine 1 though I/O cable 213.

Figure 14:
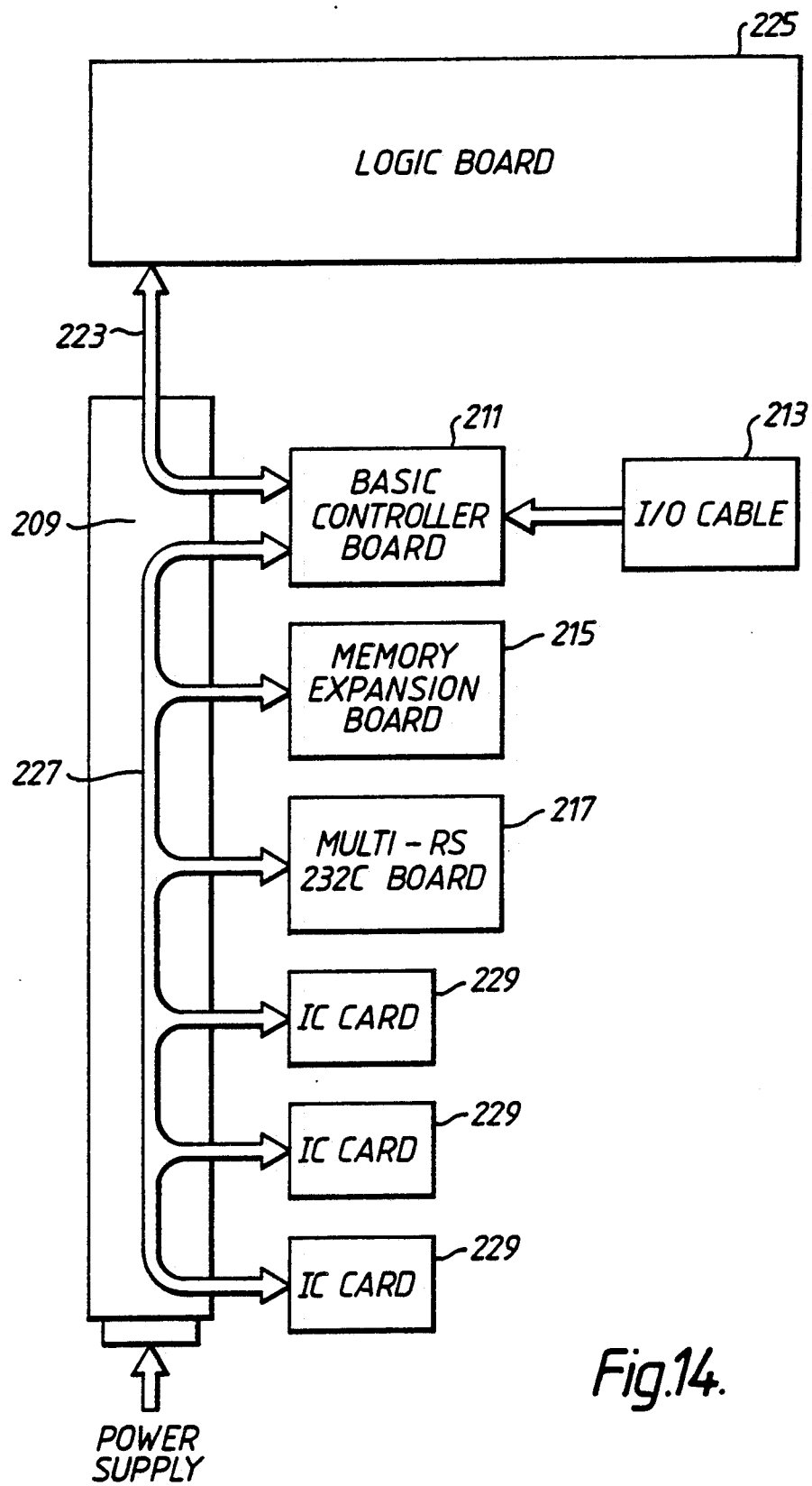
FIG. 14 is a block diagram of the interface controller shown FIG. 13.

FIG. 14. shows the bus structure of the interface controller. There are provided two main busses. One is an engine interface bus 223 between basic controller board 211 and a logic board 225 which controls the timing for image forming elements, the operation of display 17, the feeding of paper sheets and does an interface function between basic controller board 211 and elements in laser printer 2. Hereafter, logic board 225 is referred to as the print engine.

Another is an interface controller external bus 227 between two boards selected from basic controller board 211, memory expansion board 215, multi-RS-232C board 217 and three IC cards 229. Engine interface bus 223 and interface controller external bus 227 are disposed through mother board 209.

Figure 15:
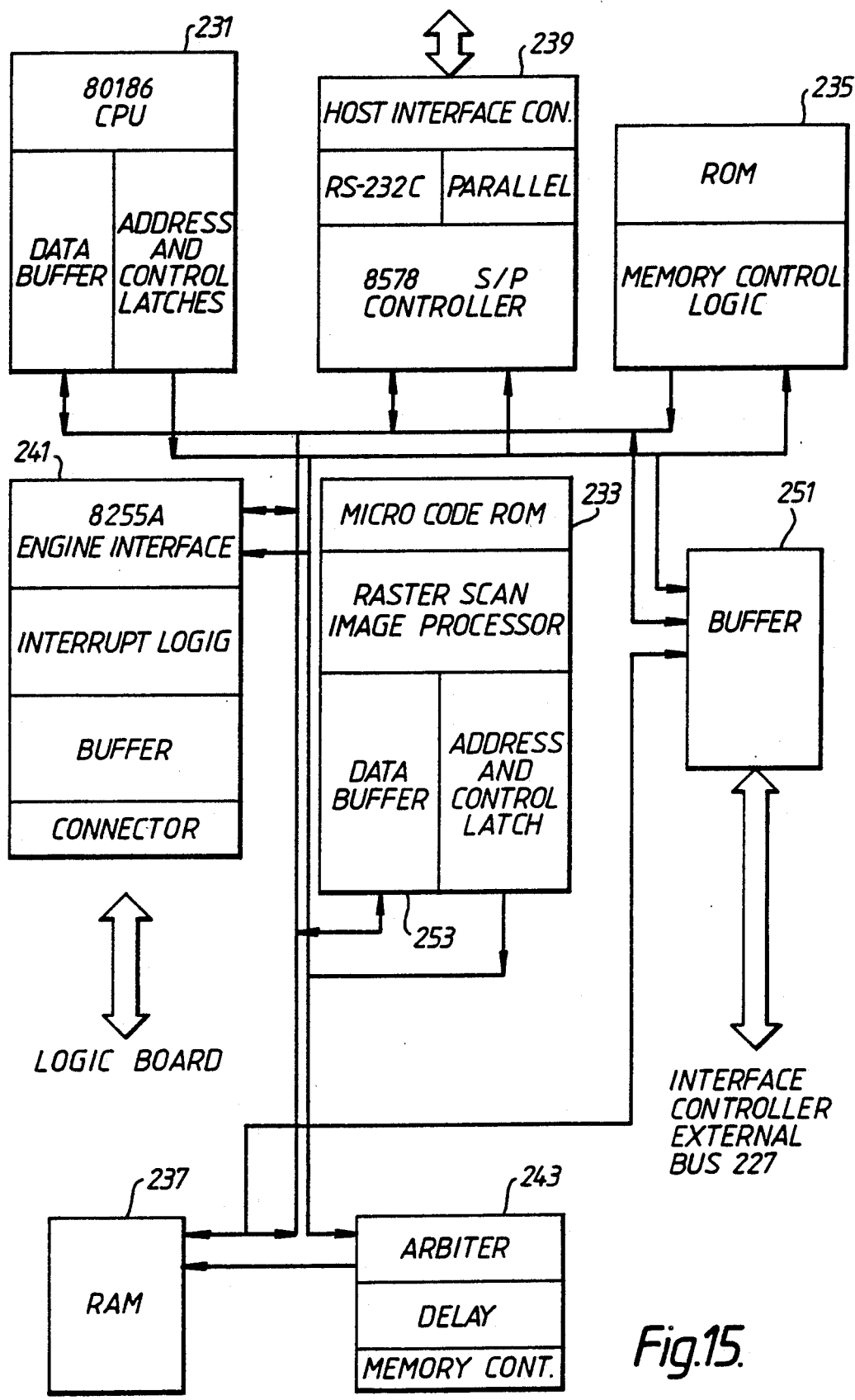
FIG. 15 is a block diagram of a basic interface controller board used in the interface controller shown in FIG. 13.

FIG. 15 shows a block diagram of basic controller board 211. Basic controller board 211 includes an 80186 microprocessor 231 and is based on a standard 80186 microprocessor system working in conjuction with a raster scan image processor 233. A read-only-memory (hereafter referred to as ROM) 235 with 255 (two hundred and fifty five) kbyte capacity is used as a program memory for microprocessor 231 and as a font stock. A random-access-memory (hereafter referred to as RAM) 237 is used as a temporary memory during the processing of microprocessors 231 and 233. Microprocessors 231 and 233 are connected to ROM 235, RAM 237, a host interface connector 239 which is provided between host machine 1 and 80186 microprocessor 231 and an engine interface 241 which is provided between logic board 225 and 80186 microprocessor 231.

Both of 80186 microprocessor 231 and raster scan image processor 233 act as bus masters. An arbiter 243 arbitrates the access of both microprocessors 231 and 233 to other elements by using a bus in basic controller board 211.

Arbiter 243 controls a dynamic memory control, memory access timing, and arbitration between 80186 microprocessor and raster scan image processor 233.

Host machine 1 supplies basic interface controller board 211 with data or commands. The data or commands are stored in a page buffer 251 through host interface connector 239.

Raster scan image processor 233 extracts the data from buffer 251 and builds a raster scan data for characters printing in fonts, raster scan images (bit maps), graphics (lines, circles, arcs, and so on), and pattern-filled graphics. The raster scan data is stored in a data buffer 253.

The operation of laser printer 2 is described as follows:

1. Initialization

When main switch S1 is turned on, AC voltage is applied to the DC power-supply unit PS. If the right-side door is closed, a fan motor M6 starts rotating.

After a 200–500 msec delay, the recycle motor M5 starts rotating in the CW direction. The toner-supply entrance shutter is opened and the toner-recovery system starts operating. The voltage is applied to the heater lamp HTR and the heat roller is heated, and the mirror motor M2 starts rotating. At this time, READY symbol flashes on display 17 to show that laser printer 2 is warming up.

After the mirror motor M2 enters the standby condition, the lamp of discharging unit 41 (hereafter referred to as lamp DCH) is turned on and the main motor M1 starts rotating.

After the main motor M1 enters the standby condition, separating unit 35 and laser diode 201 are turned on. After checking the laser power of laser diode 201 and detecting the HSYNC, laser diode 201 is turned off.

5.45 (five point four five) seconds later, the mirror motor M2 and separating unit 31 are turned off. 1.15 (one point one five) seconds later, the lamp DCH is turned off. Later, when the temperature of the heat roller of fixing unit 37 reaches the present temperature, the main motor M1 is turned off. At the same time the recycle motor M5 is rotated in the CCW direction to close the shutter of developing unit 31. The flashing READY LED 103 comes on to show that it is possible to print. A heater lamp HTR of fixing unit 37 is then turned on/off alternately to maintain the preset temperature of the heat roller.

2. Standby Condition

In the standby condition, the print engine waits for a print command from host machine 1 through basic controller board 211. When the print command is received, laser printer 2 begins the printing operation with the automatic paper feeding or the manual paper feeding.

Figure 16A:
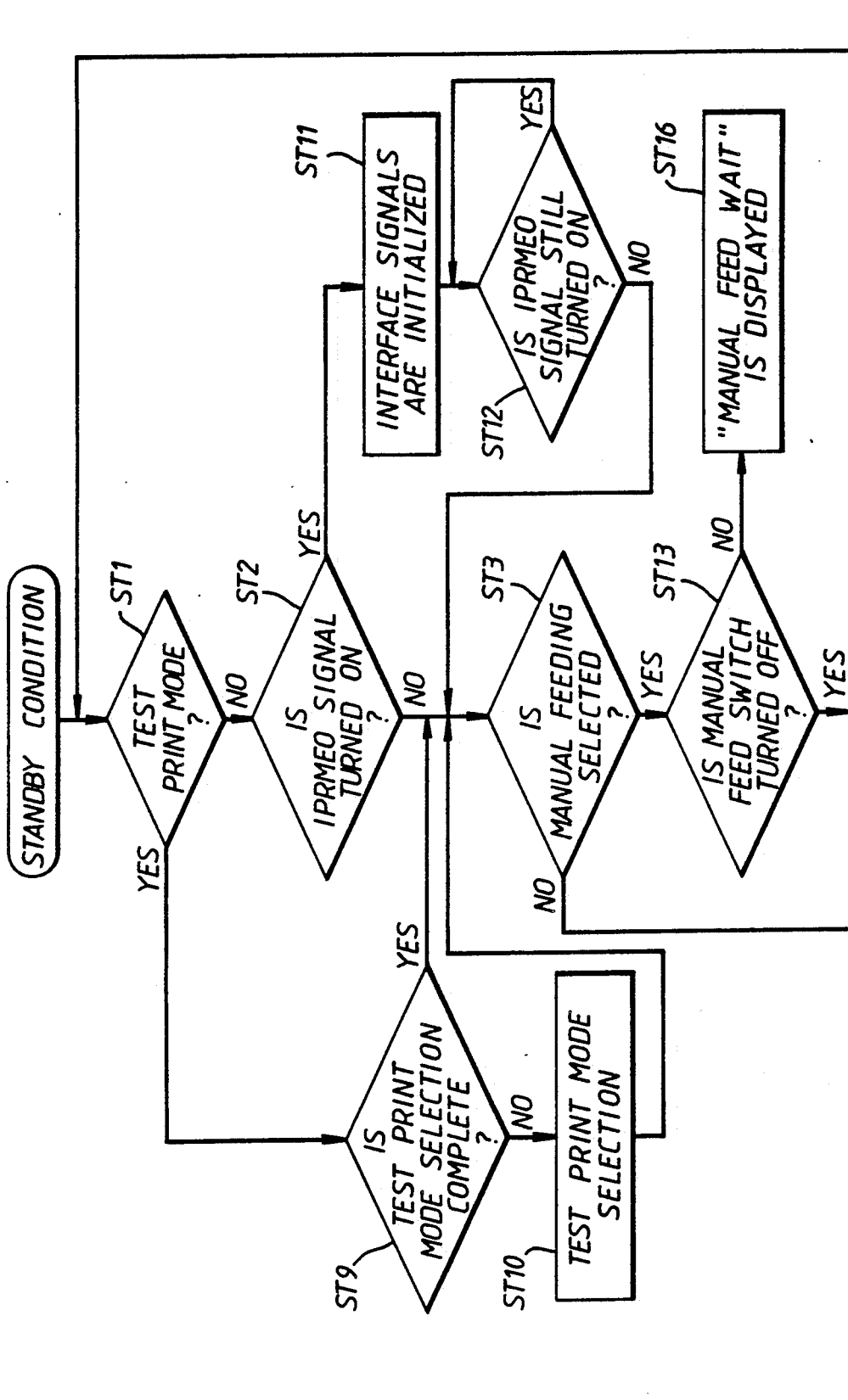
FIG. 16 is a flow chart illustrating the operation from a standby condition to the automatic paper feeding in the laser printer shown in FIG. 2.
Figure 16:
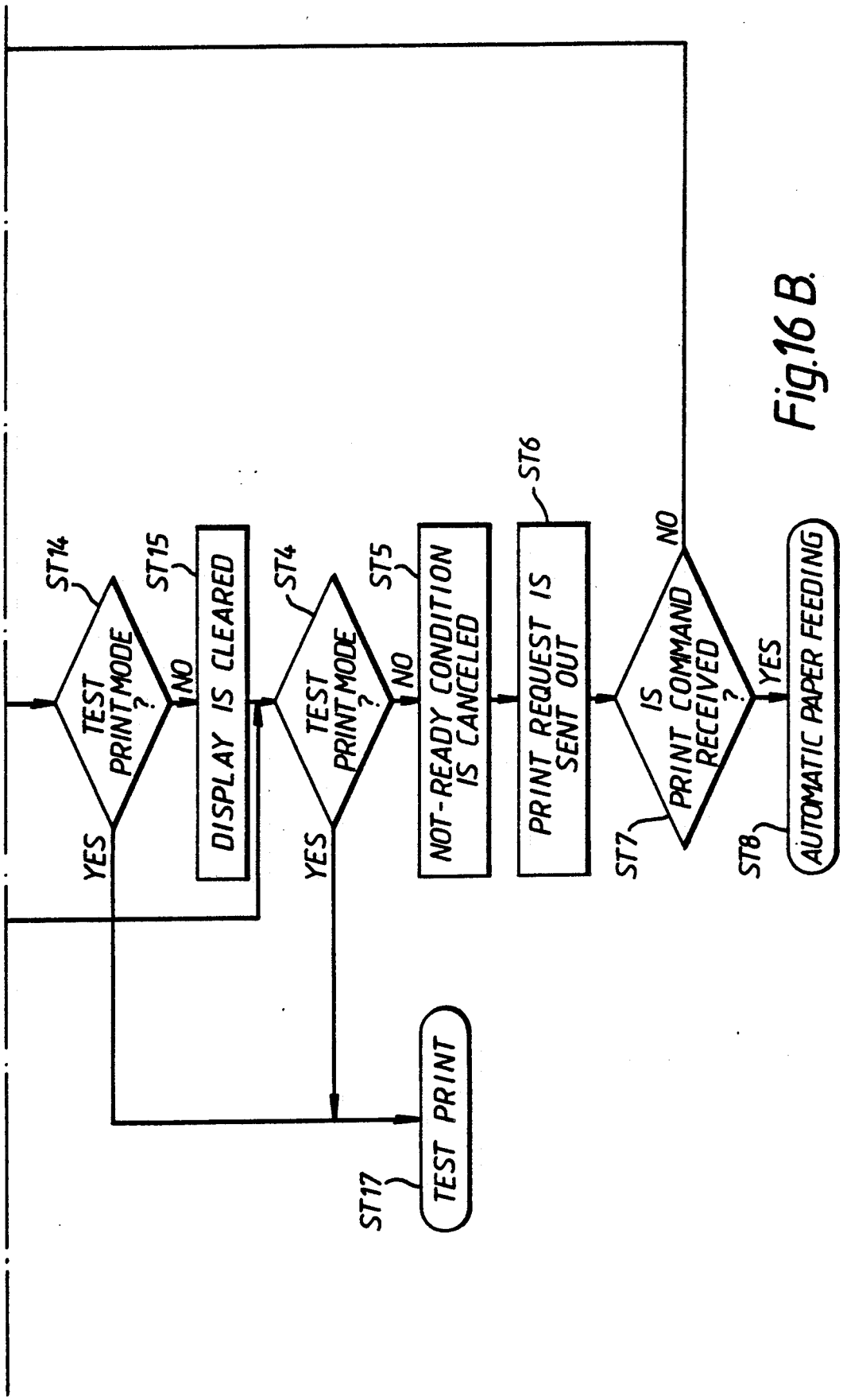

FIG. 16 shows a flow chart illustrating the operation from standby condition to automatic paper feeding.

When laser printer 2 is in standby condition, the microprocessor (hereafter referred to as the print CPU) in logic board 225 detects whether laser printer 2 is in a test print mode or not (ST1). If laser printer 2 is not in the test print mode, the print CPU detects whether or not an interface prime (hereafter referred to as the IPRMEO signal) is turned on (ST2).

If the IPRMEO signal is not turned on, the print CPU detects whether or not laser printer 2 is in the manual feeding mode (ST3). As described above, the manual feeding mode is set by previous and next keys 117 and 119 respectively on key section 18. As described later, in the manual paper feeding mode it is permitted to set the paper sheet during the automatic paper feeding mode.

If laser printer 2 is not in the manual feeding mode, the print CPU detects whether or not laser printer 2 is in the test print mode (ST4). If laser printer 2 is not in the test print mode, the print CPU cancels the not-ready conditions (ST5). Then the print CPU sends a print request to the 80186 microprocessor (hereafter referred to as the control CPU). If host machine 1 is going to print, the control CPU will sent a print command to the print CPU. The print CPU detects whether the print CPU receives the print command from the control CPU (ST7). When the print CPU receives the print command from the control CPU, the print CPU sets laser printer 2 in the automatic paper feeding mode (ST8).

After ST1, when laser printer 2 is in the standby condition and in the test print mode, the print CPU detects whether or not the test print mode is selected completely (ST9). If the test print mode is not selected completely, the print CPU leads an operator to select the test print mode completely by showing the message "SET TEST PRINT" (ST10). If the test printed mode is selected completely, the print CPU goes back to ST3.

After ST2, if the IPRMEO signal is turned on, the print CPU initializes the IPRMEO signal (ST11). The print CPU detects whether the IPRMEO signal is still turned on or not (ST12). If the IPRMEO signal is turned off, print CPU goes to the ST3.

In the ST3, if the manual feeding mode is selected, the print CPU detects whether manual feed switch S9 turned off or not ST13. If the manual-feed switch S9 is turned off by the paper sheet, the print CPU detects whether the test print mode is set or not (ST14). If the test print mode is not set, the print CPU clears the contents of display 17 (ST15). Then the print CPU goes to ST4.

If the manual-feed switch S9 is not turned off, the print CPU displays the message "MANUAL FEED WAIT" on display 17 (ST16). Then the print CPU goes to ST1. In ST4 and 14, if the test print mode is set, the print CPU performs the test print (ST16).

Figure 17A:
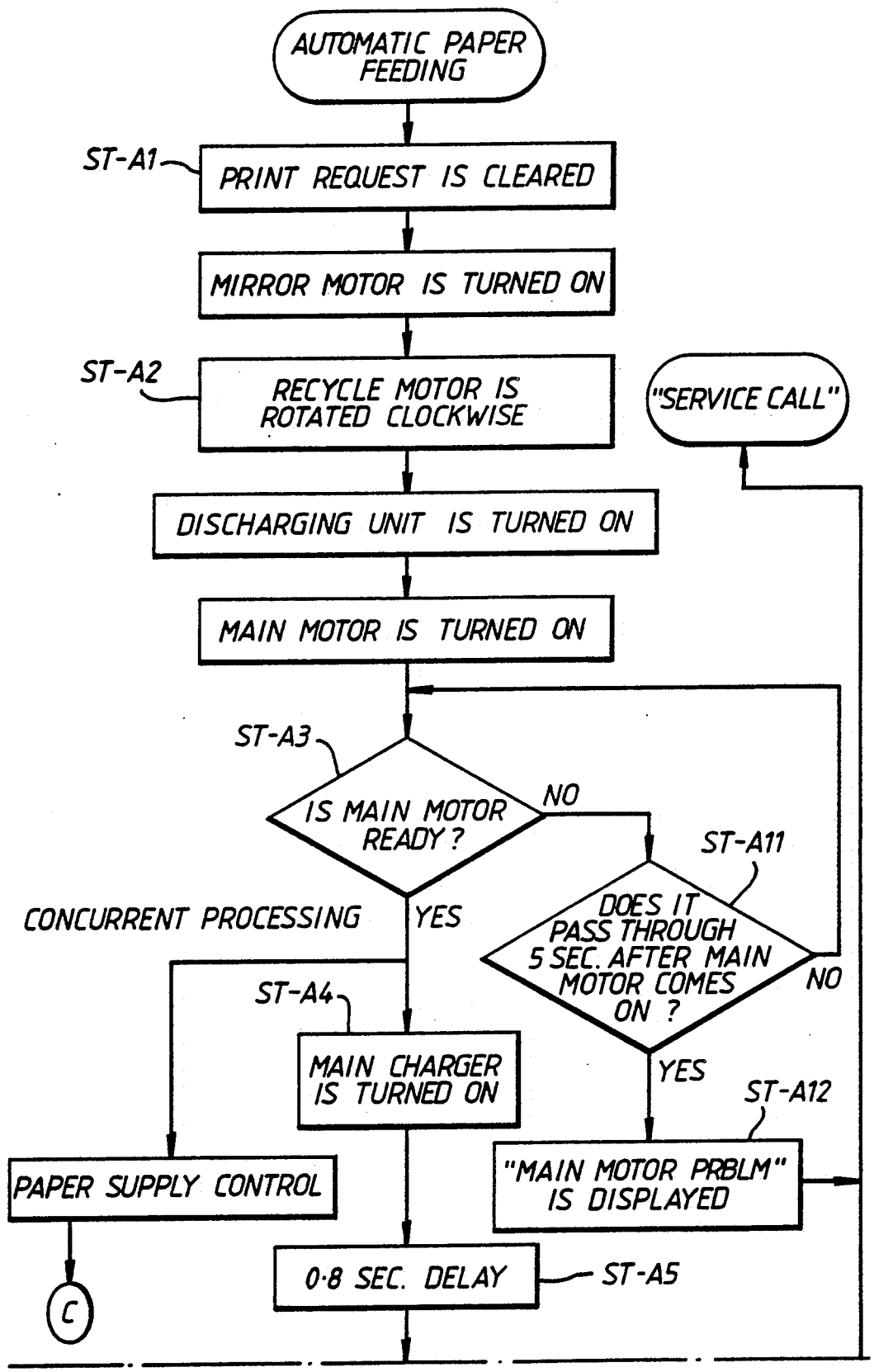
FIGS. 17, 18 and 19 are flowcharts illustrating the operation of the automatic paper feeding in the laser printer shown in FIG. 2.
Figure 17B:
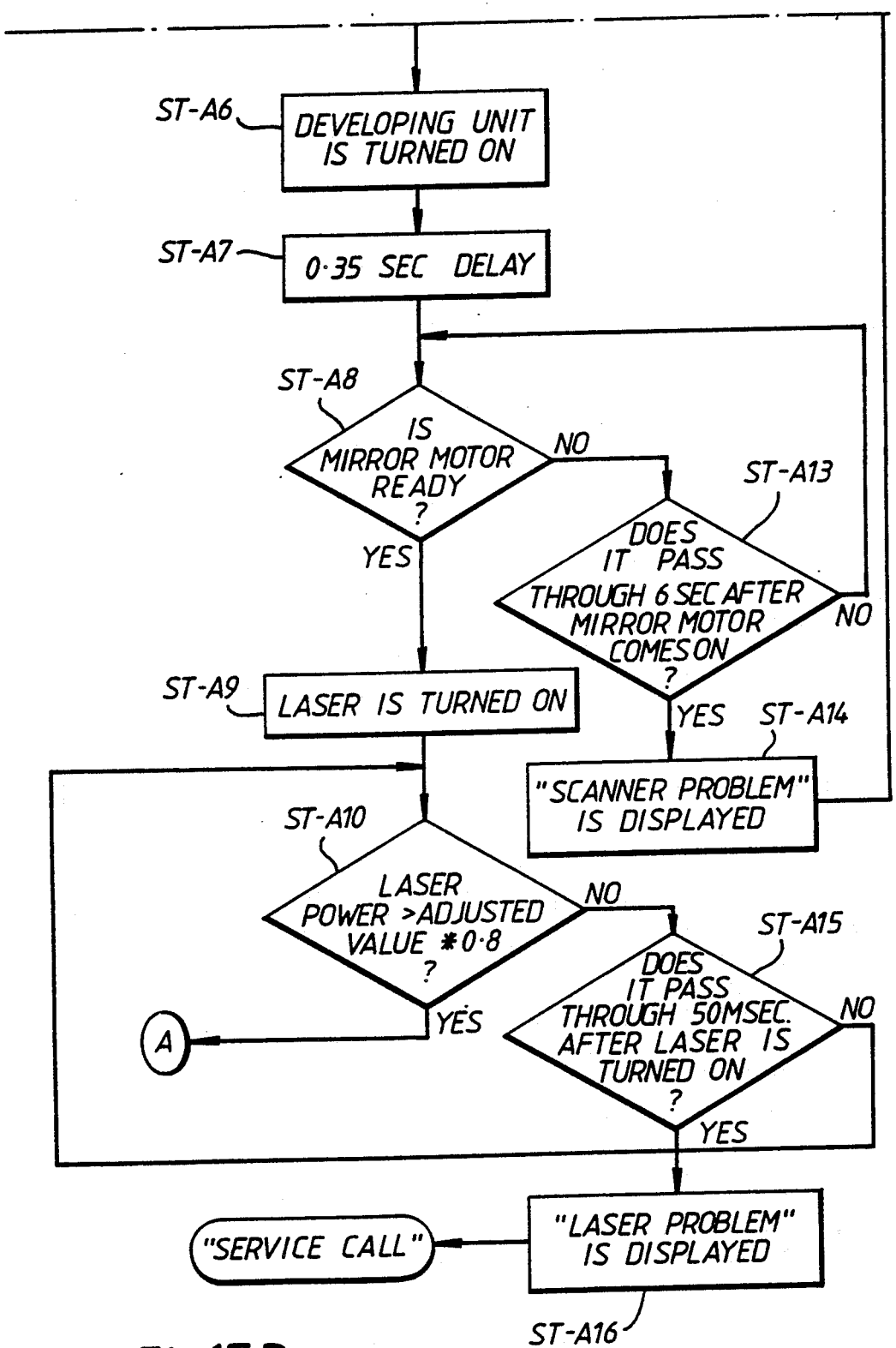
Figure 18:
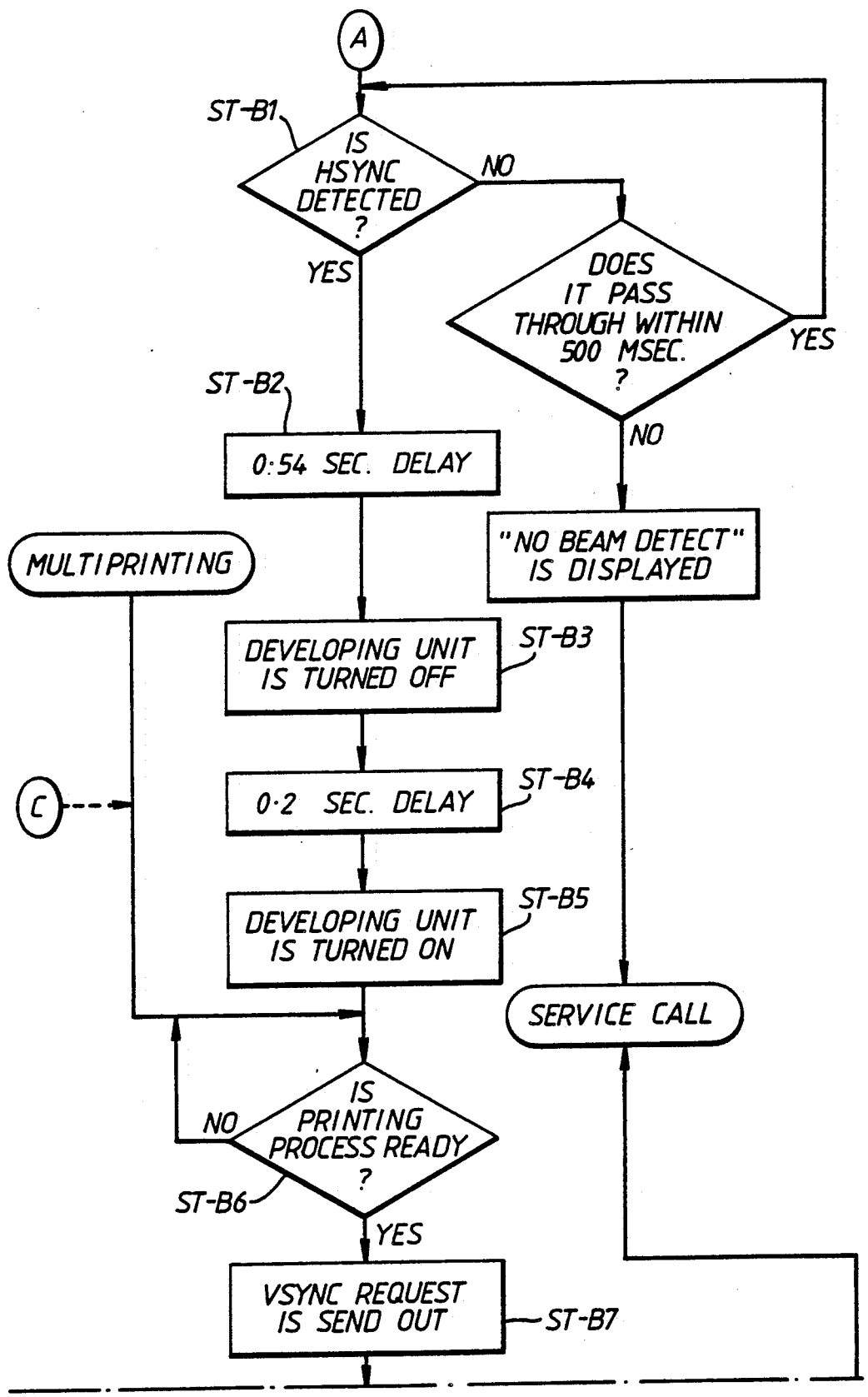
Figure 18B:
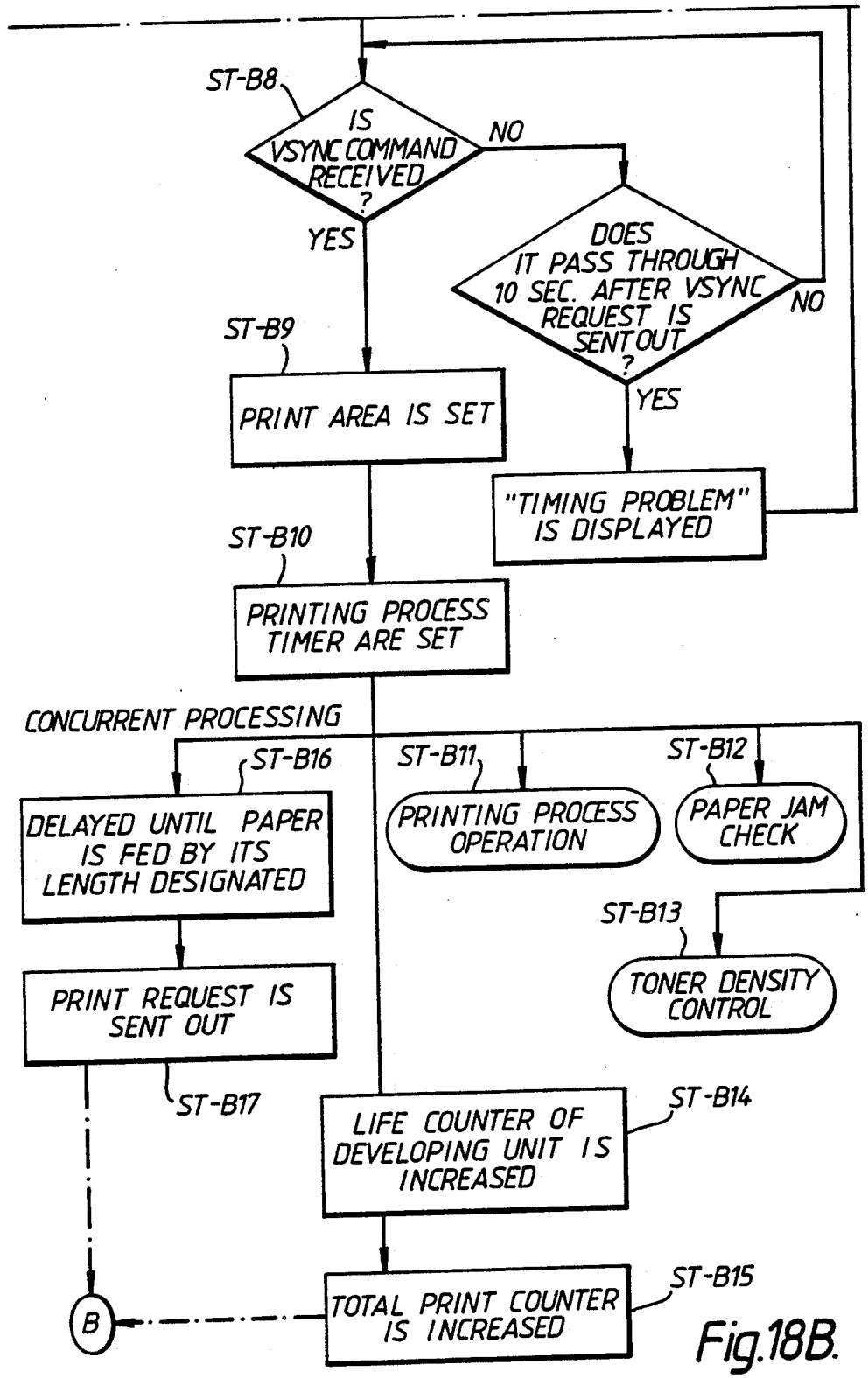

FIG. 17 shows a flow chart illustrating a portion of the operation of the automatic paper feeding.

The print CPU clears the print request in memory in which a print request is stored when the print request is sent out (ST-A1). The print CPU causes the mirror motor M2 to turn on, the recycle motor M5 to rotate in the CW direction, the lamp DCH to turn on and main motor M1 to turn on (ST-A2).

The print CPU detects whether main motor M1 is ready or not (ST-A3). If main motor M1 is ready, the print CPU causes main charger 27 to turn on (ST-A4). At the same time, the print CPU does paper-supply control. Furthermore, the print CPU waits for 0.8 (zero point eight) seconds (ST-A5), and causes developing unit 37 to turn on (ST-A6) and waits for 0.35 (zero point three five) seconds (ST-A7).

The print CPU detects whether mirror motor M2 is ready or not (ST-A8). If mirror motor M2 is ready, the print CPU causes laser diode 201 to turn on (shown in FIG. 12) (ST-A9).

The print CPU detects whether or not the power of the laser output is larger than 0.8 (zero point eight) times the adjusted value (ST-A10). If the power is larger than zero point eight times the adjusted value, the print CPU concludes that laser-diode 201 is activated and goes to the next steps (A).

In the ST-A3, if main motor M1 is not ready, the print CPU detects whether or not 5 (five) seconds pass after main motor M1 comes on (ST-A1). If 5 (five) seconds have passed, the print CPU displays the message "MAIN MOTOR PRBL" on display 17 (ST-A12). Laser printer 2 then needs a "service call" which means that only a qualified service man may solve the problem. If 5 (five) seconds do not pass, the print CPU goes back to the ST-A3. In the ST-A8, if mirror motor M2 is not ready, the print CPU detects whether 6 (six) seconds have passed or not after mirror motor M2 comes on (ST-A13). If 6 (six) seconds have passed, the print CPU has the message "SCANNR PROBLEM" displayed by display 17. In this step, laser printer 2 needs the "service call". In the ST-A10, if the power of the laser is not larger than 0.8 (zero point eight) times the adjusted value, the print CPU detects whether 50 (fifty) seconds have passed after laser diode 201 was turned on (ST-A15). If 50 (fifty) seconds have not passed, the print CPU goes back to the ST-A10. If 50 (fifty) seconds have passed, the print CPU displays the message "LASER PROBLEM" on display 17 (ST-A16).

The print CPU checks whether HSYNC is detected or not (ST-B1). If the print CPU detects HSYNC, the print CPU waits 0.54 (zero point five four) seconds (ST-B2) and turns off a developing bias which is applied to developing unit 31 (ST-B3). Then the print CPU waits 0.2 (zero point two) seconds (ST-B4) and turns the developing bias on (ST-B5).

The print CPU detects whether the printing process is ready or not (ST-B6). That is, the print CPU detects the temperature of fixing unit 37, the presence of toner and so on. If the printing process is ready, the print CPU sents a VSYNC request to the control CPU of the basic controller board 211 (ST-B7). The print CPU detects whether a VSYNC command is received from the control CPU (ST-B8). If the print CPU receives the VSYNC command, the print CPU decides the print area (ST-B9) and sets a timer for the printing process (ST-B10).

Next, the print CPU does five operations while printing. The print CPU does the printing process (ST-B11), checking for a paper jam (ST-B12) and toner-density control (ST-B13). Fourth, the print CPU increments a life counter of developing unit 31 (ST-B14), fixing unit 37 and cleaning unit 39. The print CPU increments the total which represents the number of prints made (ST-B15).

Fifth, the print CPU waits until the paper sheet is fed by its designated length. For example, LEGAL; 4.22 (four point two two) seconds, FOLIO: 3.86 (three point eight six) seconds, LETTER; 3.21 (three point two one) seconds, STATEMENT: 2.29 (two point two nine) seconds (ST-B16). After waiting, the print CPU sends out the print request to the control CPU (ST-B17).

Figure 19:
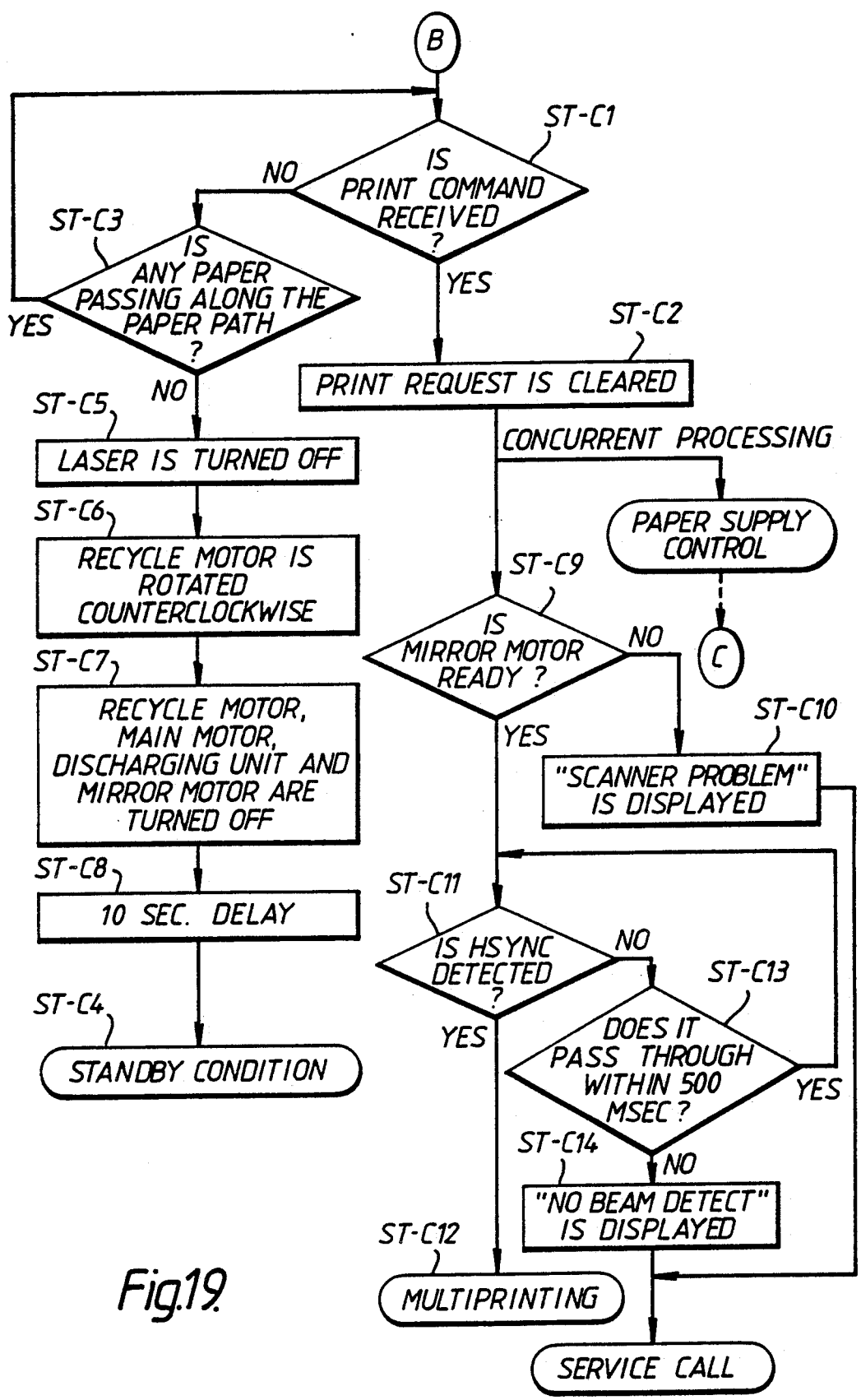

Refering to FIG. 19, after the print request is sent out or total print counter is incremented, the print CPU detects whether or not the print command is received (ST-C1). If the print CPU receives the print command, the print CPU clears the print request (ST-C2).

If the print CPU fails to receive the print request, the print CPU detects whether or not any paper sheet is passing along the paper path (ST-C3). If some papers are passing, the print CPU goes back to the ST-C1. If paper is not passing, the print CPU sets laser printer 2 into the standby condition (ST-C4). That is, the print CPU turns laser diode 201 off (ST-C5), and causes recycle motor 133 to rotate in the CCW direction for a time (ST-C6). The print CPU also causes recycle motor 133, main motor M1, discharging unit 41 and mirror motor M2 to turn off (ST-C7). The print CPU waits for 10 (ten) seconds to be in the standby condition (ST-C8).

After the ST-C2, the print CPU begins to control the paper-supply. Concurrently, the print CPU detects whether or not the mirror motor M2 is ready (ST-C9). If the mirror motor M2 is not ready, the print CPU displays "SCANNER PROBLEM" on display 17 (ST-C10). The message "SCANNER PROBLEM" means the service man should be called.

If the mirror motor M2 is ready, the print CPU detects whether or not the HSYNC signal is present (ST-C11). If the print CPU detects the HSYNC signal, the print CPU goes to multi printing process (ST-C12). That is, the print CPU repeats the same steps described as above.

If the print CPU fails to detect the HSYNC signal, the print CPU detects whether 500 (five hundred) mseconds (ST-C13) pass. If 500 mseconds pass, the print CPU goes back to the ST-C11. If 500 mseconds fail to pass, the print CPU displays a message "NO BEAM DETECT" on display 17 (ST-C14). The message "NO BEAM DETECT" means a need for calling the service man should be called.

Figure 20:
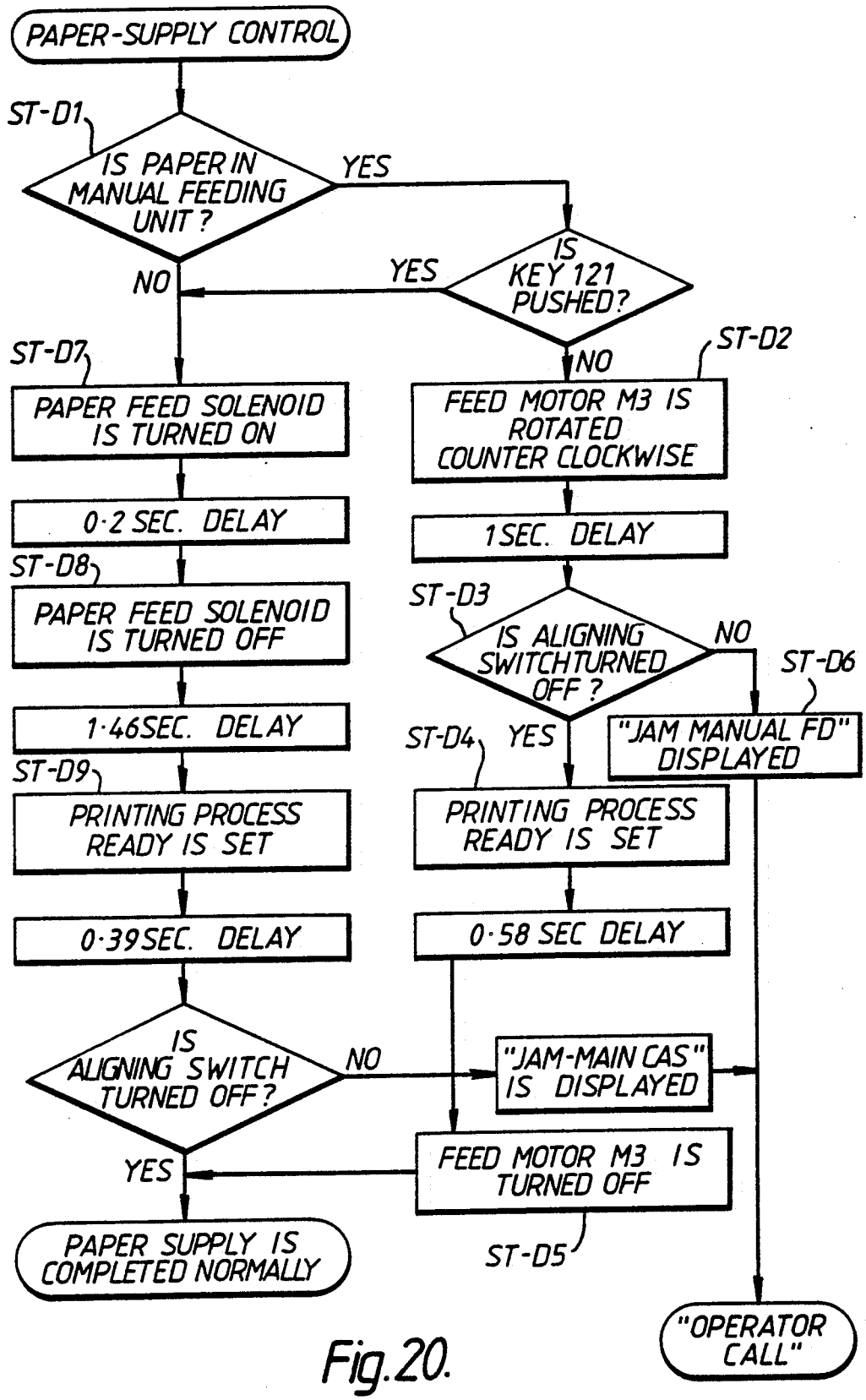
FIG. 20 is a flow chart illustrating the operation of manual paper feeding in the laser printer shown in FIG. 2.
Figure 21:
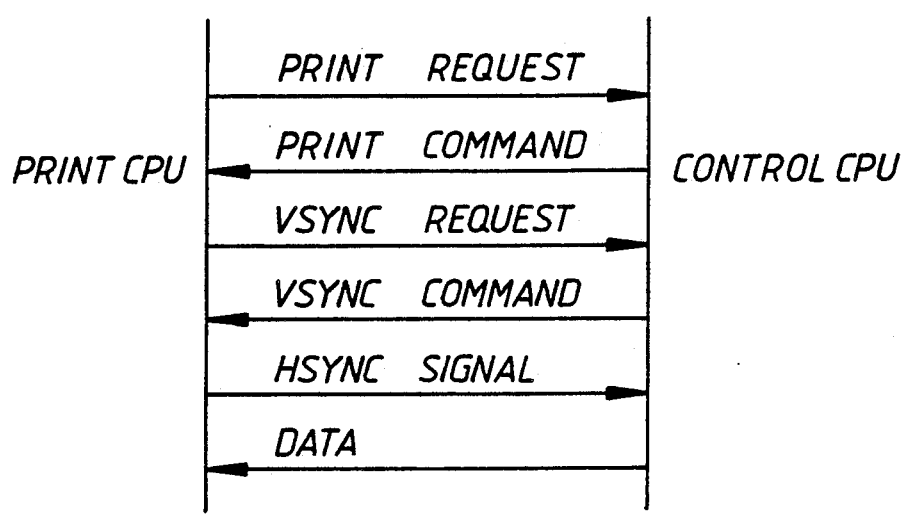
FIG. 21 is a flow chart illustrating the delivery of data and a command between the print CPU and the control CPU shown in FIGS. 14 and 15.

FIG. 20 shows a flow chart illustrating the operation of the paper supply control. The print CPU detects whether or not any paper sheet is in manual feeding unit 45 (ST-D1). If the print CPU detects some paper sheet in manual feeding unit 45, the print CPU goes into the manual paper feeding mode. That is, the print CPU makes feed motor M3 rotate in the CCW direction (ST-D2). Feed motor M3 drives manual-feed rollers 63 so that the paper sheet is fed into laser printer 2. After one second, the print CPU detects whether or not the fed paper sheet turns off an aligning switch provided near aligning roller 55 (ST-D3). When the manual-feed switch detects the fed paper sheet, the print CPU sets the printing process ready (ST-D4). This condition shows that the leading edge of the paper sheet reaches the starting position of the printing process. After a 0.58 (zero point five eight) second delay, the print CPU turns off feed motor M3 (ST-D5). If a paper sheet is in manual feeding unit 45, the paper supply is completed normally. In the ST-D1, if the print CPU detects a paper sheet, the print CPU will fail to go into the manual paper feeding mode and goes instead to the automatic paper feeding mode if one of keys 117, 119, 121 and 123 is pushed.

In the ST-D3, if the aligning switch fails to be turned off, the print CPU displays the message "JAM MANUAL FD" in display 17 (ST-D6). This message leads the operator to the jam in manual feeding unit 45.

In the ST-D1, if the print CPU fails to detect any paper sheet in manual feeding unit 45, the print CPU goes to the automatic paper feeding mode. At this time, the print CPU causes supply roller 47 drive so that the paper sheets in cassette 43 are picked up. That is, the paper-feed solenoid is turned on so that supply roller 47 is rotated (ST-D7). After a 0.2 (zero point two) second delay, the print CPU causes the paper feed solenoid to turn off (ST-D8). After a 1.46 (one point four six) second delay, the print CPU makes the printing process ready (ST-D9). After a 0.39 (zero point three nine) second delay, the print CPU detects whether or not the aligning switch is turned off. The aligning switch is provided near aligning rollers 55 to be turned off by the paper sheet reaching aligning rollers 55. If the print CPU detects that the aligning switch is turned off, the paper supply is completed normally. If the print CPU fails to detect that the aligning switch is turned off, the print CPU displays the message "JAM-MAIN CAS" on display 17.

In the manual feeding mode, the printing process is as follows.

The manual feeding mode is designated through key in display 17 (shown in FIG. 3). Further more, as described above, the automatic paper feeding mode is shifted into the manual feeding mode due to setting paper sheet in manual feeding unit 45. In both ways, there must be a paper sheet in manual feeding unit 45 in the manual feeding mode.

When the manual feed switch detects the fed paper sheet, the print CPU enters a condition of waiting for the print command.

When the print command from the control CPU is received by the print CPU, recycle motor 133 rotates in the CW direction to open the toner-supply entrance shutter. At the same time, main motor M1 and mirror motor M2 start rotating and the discharging unit 41 comes on. Then the recycle operation begins.

When the main motor M1 enters the standby condition, the feed motor M3 is reversed to rotate the manual-feed roller so that paper sheet is supplied from manual feeding unit 45. At this time, main charger 27 comes on.

Laser diode 201 is turned on and the HSYNC signal is detected (ST-E1). Confirmation is made that the mirror motor M2 is in the standby condition. Then, when the paper sheet reaches the starting point of the printing process, the VSYNC request is sent to the control CPU.

When the print CPU receives the VSYNC command from the control CPU, the surface of photosensitive drum 25 is irradiated by the laser beam for exposure. At this time, it is confirmed that the paper sheet has reached aligning roller 55, then feed motor M3 is rotated in the CW direction to feed the paper sheet. Developing unit 31, transfer unit 33 and separating unit 35 are turned on at fixed timings in a regular sequence. When the toner density after developing is lower than the determined value, toner motor M4 is turned on to supply the toner.

When the laser exposure comes near the end of the print area, it is checked whether or not any paper sheet is on manual feeding unit 45. At this time, if a paper sheet is so detected, the next print command may be received. After the laser exposure for the print area is completed, laser diode 201 is turned off. When the next print command is received, feed motor M3 is rotated in the CW direction so that paper sheet is supplied from manual feeding unit 45 (ST-E2). After this time, steps the ST-E2 through the ST-E2 described above are performed repeatedly. Each time the print command is received, the steps from the ST-E1 are performed repeatedly.

When the paper sheet is not detected during printing, or when the next print command is not received, each element is turned off at fixed timings sequentially. First, main charger 27 is turned off, and later the feed motor M3 is turned off. Then developing unit 31 is turned off and the transfer unit 33 and separating unit 35 are turned off in a regular sequence. Then recycle motor M5 is reversed to close the shutter of the toner-supply entrance. Finally, the main motor M1, discharging unit 41 and the mirror motor M2 are turned off in a regular sequence to finish the printing operation. Laser printer 2 then goes back to the standby condition.

The data transfer between the print CPU and the control CPU is as follows:

When a power switch of the print CPU is turned on, a heater of fixing unit 37 and the mirror motor and so on are supplied with power and the print CPU enters a warm-up state. After the heater is heated to a predetermined temperature and the mirror motor M2 rotates the predetermined number of revolutions, the print CPU enters the ready state and sends to the control CPU a print-ready signal and a print request.

Reading the print request from the print CPU, the control CPU recognizes that the print CPU is ready for printing. In response to the print request, the control CPU specifies a paper-feeding mode and the size of paper sheet for printing and sends to the print CPU command data through the engine interface bus 223 (show in FIG. 14) to set the operation mode. After completing setting the operation mode, the control CPU sends to the print CPU a print command.

In response to the print command, the print CPU starts rotating photosensitive drum 25 and feeds the paper sheet according the designated paper-feeding mode. As described above, in the automatic paper feeding mode, a paper sheet in manual feeding unit 45 has priority.

When it is permitted to write the image data after photosensitive drum 25 is charged and laser diode 201 is checked, the print CPU sends to the control CPU the VSYNC request through engine interface bus 223.

After reading the VSYNC request from the print CPU, the control CPU sends to the print CPU a VSYNC command through the data bus when an image transmission is ready.

On receiving the VSYNC command, the print CPU sends to the control CPU a video transporting status. Then, the print CPU starts to send horizontal synchronizing signals of cyclic pulses in a number corresponding to an image print-area on the paper sheet within the size designated by the control CPU.

On receiving the horizontal synchronizing signal, the control CPU sends to the print CPU the image data of the corresponding horizontal line, in synchronizing with a video clock signal.

The operation of sending the image data is repeated at every receipt of the horizontal synchronizing signal.

The print CPU transmits the image data to laser driver 203 to modulate a semiconductor laser beam and record the image data on photosensitive drum 25.

After sending the horizontal synchronizing signals for one page, the print CPU turns off the video transporting status, which indicates the end of recording one page of image data to the control CPU.

At a sequential page printing, the control CPU reconfirms the print request and then sends the print command to repeat the print sequence request through the data bus. If a problem occures in laser printer 2, the print-ready signal is turned off. After the print-ready signal is turned off, the control CPU known the cause of the problem by reading the status data transmitted from the print CPU.

For the pitches of recording the image data, the number of vertical scanning pitches is 300 (three hundred) pitches/inch (11.81 (eleven point eight one) pitches/mm). The number of horizontal dots is also 300 (three hundred) dotes/inch. When the image data is transmitted in synchronization with the video clock signal after the horizontal synchronizing signal, it is automatically printed at horizontal dot intervals of 300 (three hundred) dots/inch.

Figure 22:
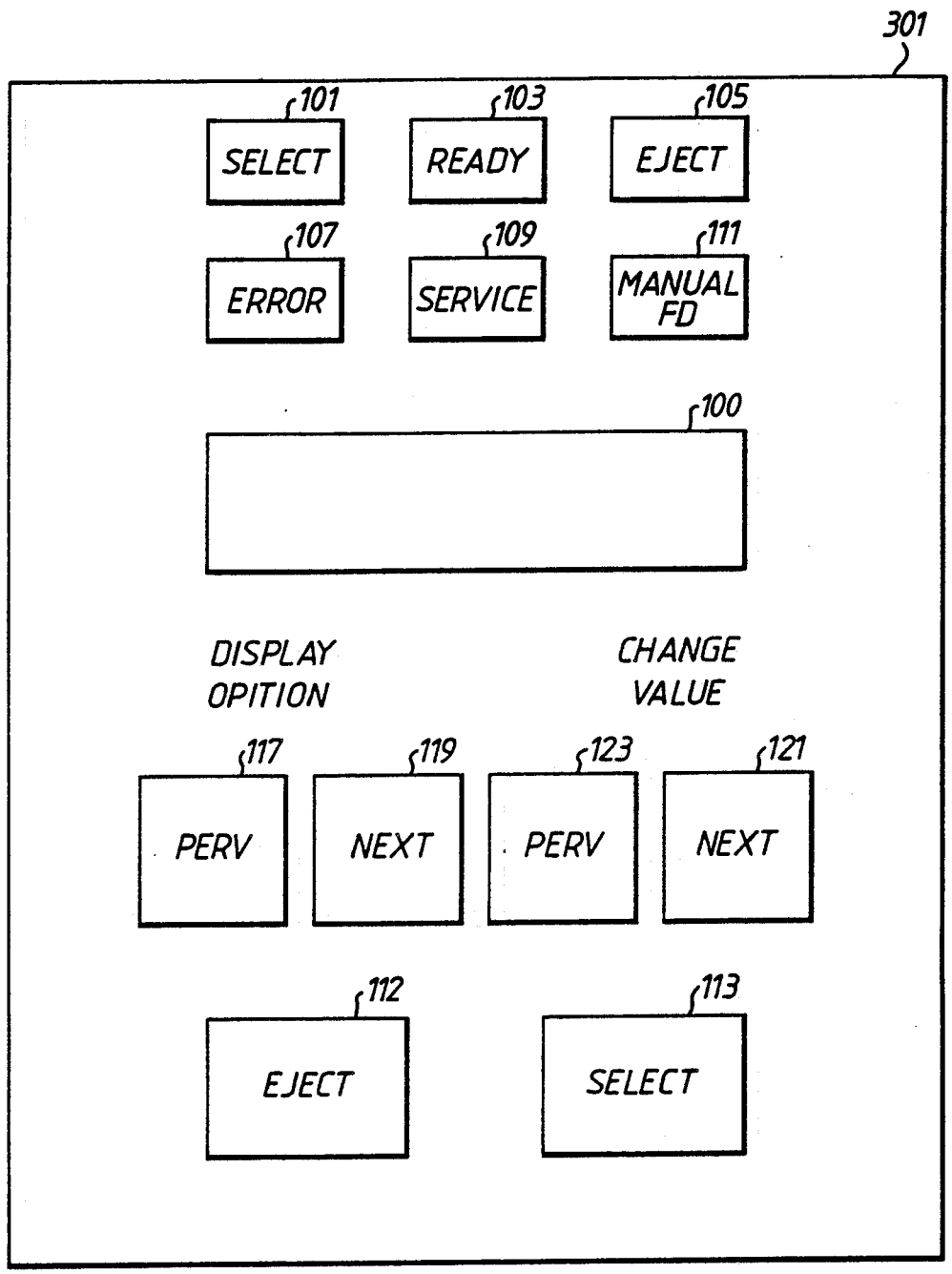
FIG. 22 is a plan view of a control panel of the laser printer of another embodiment according to the present invention.

A further embodiment of the invention is illustrated in FIG. 22. The difference between the first embodiment and the present embodiment is that a control panel 301 has a function corresponding to display 17 and key section 18 shown in FIGS. 3 and 4. Fundamentally control panel 301 is the same structure as that of display 17 and key section 18. Therefore the reference numbers designating corresponding parts are the same as those in FIGS. 3 and 4.

Referring now to FIG. 22, control panel 301 has six LEDs including select LED 101, ready LED 103, eject LED 105, error LED 107, service LED 109 and manual FD LED 111.

Select LED 101 shows whether or not laser printer 2 is connected to host machine 1. When select LED 101 is turned on, select LED 101 indicates that laser printer 2 is in the on-line mode, that is, host machine 1 controls laser printer 2. When select LED 101 is turned off, select LED 101 indicates that laser printer 2 is in the off-line mode, that is, host machine 1 fails to control laser printer 2.

Eject LED 105 shows whether or not host machine 1 is sending data corresponding to an image.

Figure 23:
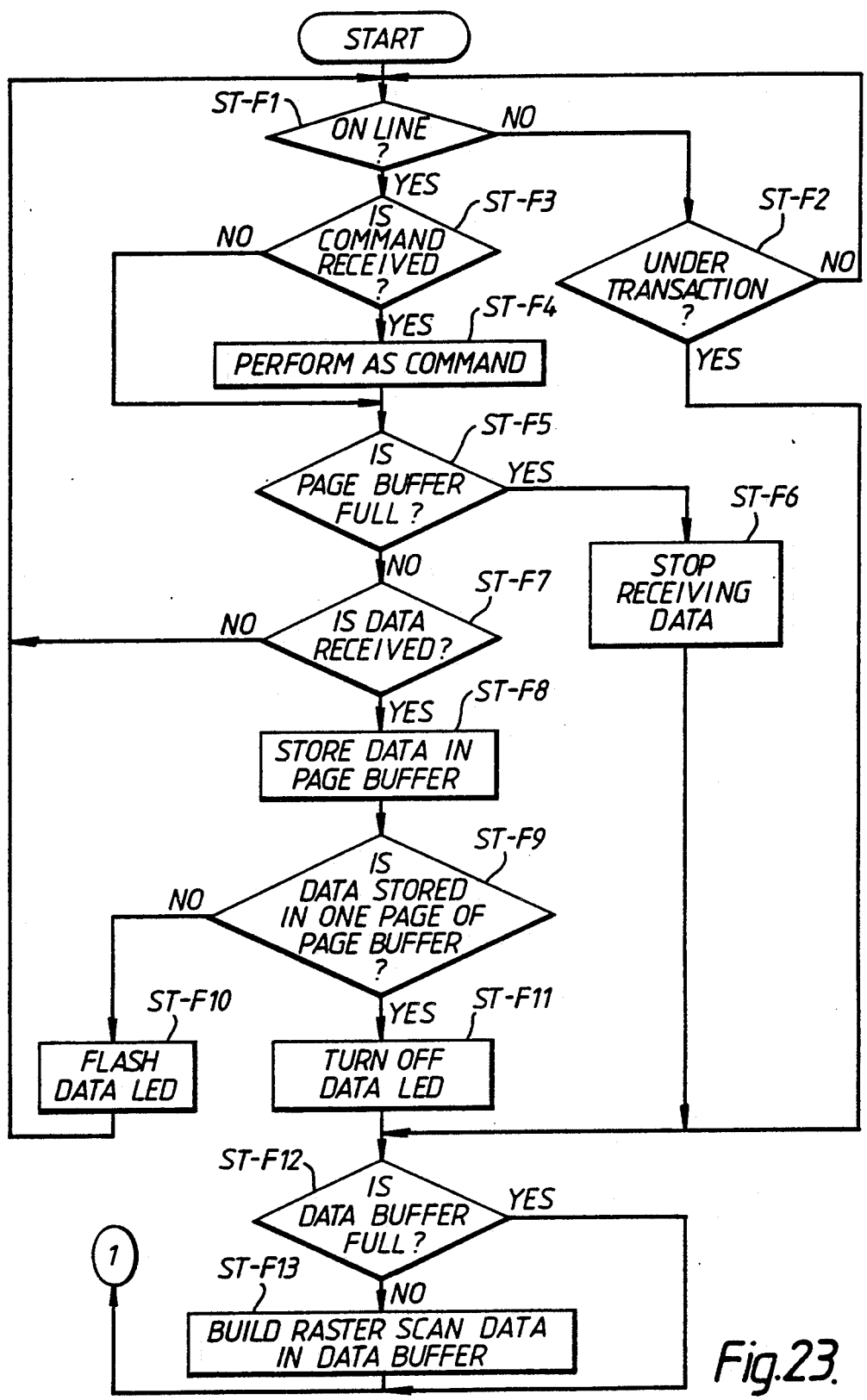
FIGS. 23 and 24 are flow charts illustrating the operation of a laser printer with the control panel shown in FIG. 22.
Figure 24:
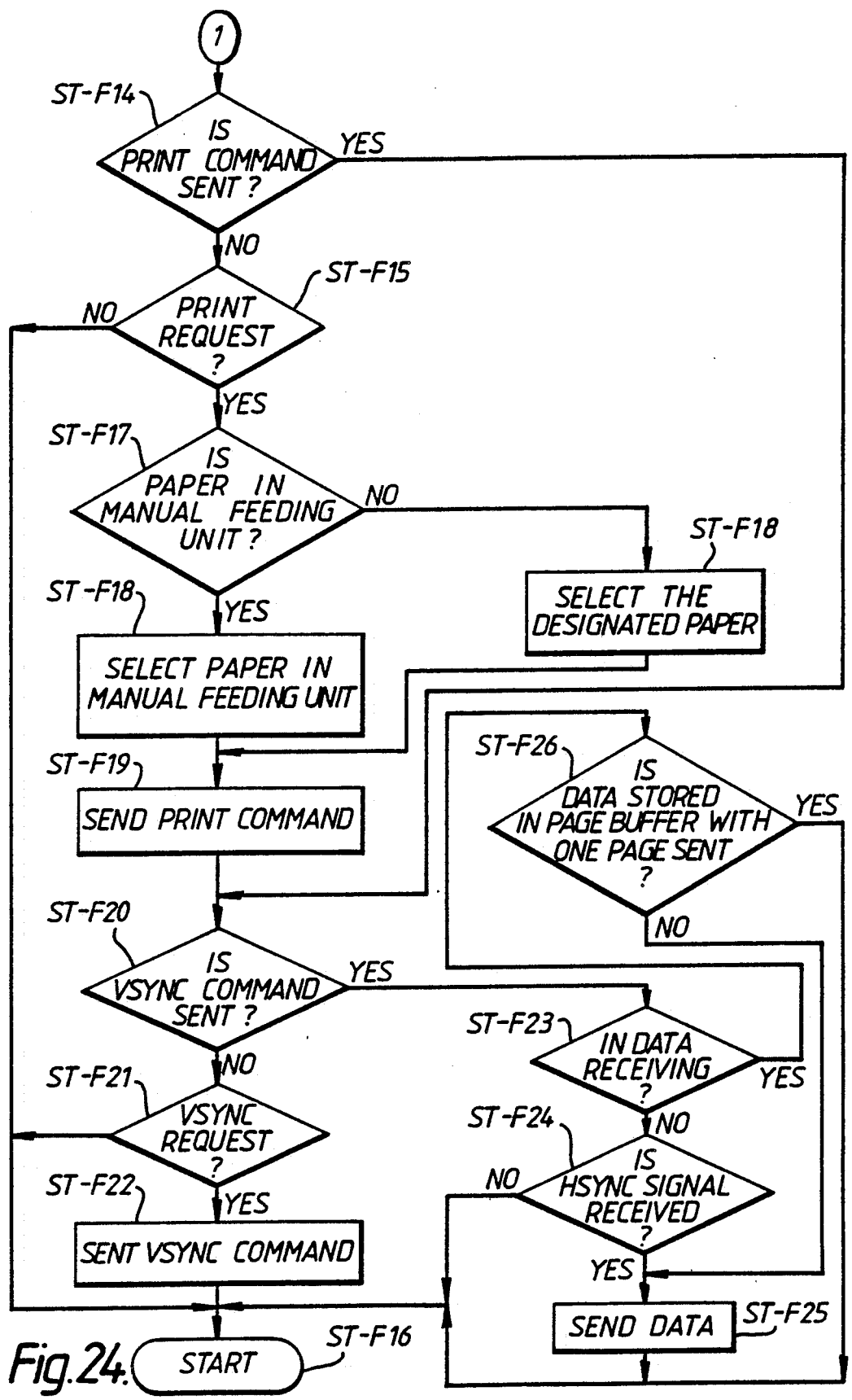

Referring now to FIGS. 23 and 24, the operation of the laser printer including control panel 301 is as follows.

The control CPU checks whether or not laser printer 2 is in the on line mode (ST-F1). If laser printer 2 is in the off-line mode, the control CPU detects whether or not laser printer 2 is printing the data previously received from host machine 1 (ST-F2). If laser printer 2 is printing the data, the control CPU continues to control laser printer 2 such that laser printer 2 prints the data. If laser printer 2 finishes printing the data, the control CPU detects whether or not laser printer 2 is in the on-line mode again.

When laser printer 2 enters the on-line mode, the control CPU receives the data or the command from host machine 1. The control CPU detects whether or not the received signal is a command (ST-F3). If the received signal is a command, the control CPU controls laser printer 2 according to the command (ST-F4).

If the control CPU receives not a command but instead data from host machine 1, the control CPU checks whether or not a page buffer 251 is full of data (ST-F5). When page buffer 251 is full of data, the control CPU stops receiving the data from host machine 1 (ST-F6) and permits the print CPU to continue printing. When page buffer 251 is not full of data, the control CPU checks whether or not the data sent by host machine 1 is the data representing the image (ST-F7). If the control CPU receives the data representing the image, the control CPU stores the data in page buffer 251 (ST-F8). The control CPU checks whether or not one page of data is stored in page buffer 251 (ST-F9). If the control CPU fails to finish storing the one page of data in page buffer 251, the control CPU makes eject LED 105 flash (ST-F10). Then, the control CPU goes back to the ST-F1.

If the control CPU finishes storing the one page of data in page buffer 251, the control CPU turns off eject LED 105 (ST-F11) and moves into printing steps.

In the ST-7, that is, after the control CPU detects that page buffer 251 is not full of data, if the control CPU fails to receive the data representing the image, the control CPU detects whether or not laser printer 2 is in the on-line mode again.

The printing steps are as follows. At first, the control CPU detects whether or not data buffer 253 is full of data (ST-F12).

If data buffer 253 is not full of data, the control CPU gives the raster scan image processor an instruction to build the raster scan data from the data sent by host machine 1 (ST-F13). The build raster scan data is stored in data buffer 253.

Referring now to FIG. 24, the control CPU detects whether or not the print command is sent (ST-F14). If the control CPU fails to send the print command, the control CPU detects whether or not the control CPU receives the print request from the print CPU (ST-F15). If the control CPU has not received the print request, the control CPU goes back to the initial step (ST-F16). This is because laser printer 2 is not ready to print. If laser printer 2 is ready to print, the print CPU sends the print request to the control CPU.

If the control CPU receives the print request from the print CPU, the control CPU detects whether or not a paper sheet is in manual feeding unit 45 (ST-F17). When the paper sheet is in manual feeding unit 45, the control CPU decides that laser printer 2 is in the manual paper feeding mode. When a paper sheet is not in manual feeding unit 45, the control CPU concludes that laser printer 2 is in the automatic paper feeding mode using the designated paper, e.g., the paper sheet from cassette 43. The information about the paper sheet is sent to the print CPU (ST-F18).

After the ST-F18, the control CPU sends the print command to the print CPU (ST-F19). The control CPU detects whether or not the control CPU sends the VSYNC command to the print CPU (ST-F20).

If the control CPU fails to send the VSYNC command, the control CPU checks whether or not the control CPU receives the VSYNC request from the print CPU (ST-F21).

If the control CPU receives the VSYNC request, the control CPU sends the VSYNC command to the print CPU (ST-F22). In response to the VSYNC command, the print CPU controls the timing of the image forming process. After the control CPU sends the VSYNC command, the control CPU waits for the VSYNC Request from the print CPU (ST-F16).

At the ST-F20, if the control CPU sends the VSYNC command, the control CPU detects whether or not the data is being sent from the data buffer 253 to the print CPU (ST-F23).

If the control CPU fails to send the data, the control CPU detects whether or not the print CPU sends the HSYNC signal to the control CPU (ST-F24). If the HSYNC signal is not sent to the control CPU, the control CPU goes back to the initial step waiting for the HSYNC signal.

At the ST-F24, the HSYNC signal is sent to the control CPU, the control CPU sends the data from the data buffer 253 to the print CPU synchronously with a clock (ST-F25).

At the ST-F23, if the control CPU is sending the data to the print CPU, the control CPU detects whether or not the control CPU finishes sending the one page of data (ST-F26).

If the control CPU finishes sending the one page of data to the print CPU, the control CPU goes back to the initial state to wait for the next transmission of the data.

At the ST-F26, if the control CPU fails to finish sending the one page of data to the print CPU, the control CPU continues sending the data until the one page of data is sent.

In the present embodiment, during the transmission of the data, eject LED 105 is flashed so that the operator is permitted to confirm that laser printer 2 is receiving the data from host machine 1. Especially, if it takes some time to receive the data, the operator may feel uneasiness about the delay. According to the present embodiment, the operator is free from the above uneasiness.

What is claimed is:

1. A data processing system for producing a visible image on an image forming medium, comprising:
    host computer means for processing data and generating signals corresponding to an image to be formed;
    image forming means responsive to the host computer means for forming the visible image on the image forming medium, including:
    automatic supply means for automatically supplying the image forming medium from a supply thereof;
    first receiving means for receiving the image forming medium with the visible image;
    first conveying means for conveying the image forming medium with the visible image to a first receiving means along a first path;
    alternative means, provided separately from the automatic supply means, for manually supplying the image forming medium;
    second receiving means for receiving the image forming medium with the visible image;
    second conveying means for conveying the image forming medium with the visible image to the second receiving means along a second path being substantially straight; and
    selection means for automatically selecting either the automatic supply means or the alternative means, the selection means including means for detecting a presence of the image forming medium in the alternative means, thereby automatically deactivating the automatic supply means and automatically activating the second conveying means in response thereto.

2. The system of claim 1, wherein the selection means includes means for selectively deactivating the alternative means and activating the automatic supply means.

3. An image forming apparatus for producing an image on an image forming medium, comprising:
    means for generating image signals corresponding to an image to be formed; and
    printing means for producing the visible image on the image forming medium in response to the image signals, including:
    automatic supply means for automatically supplying the image forming medium from a supply thereof to the printing means;
    first receiving means for receiving the image forming medium with the image;
    first conveying means for conveying the image forming medium with the image from the automatic supply means to the first receiving means along a first path;
    alternative means separate from the automatic supply means for manually supplying the image forming medium;

second receiving means for receiving the image forming medium with the image;

second conveying means for conveying the image forming medium with the image from the alternative means to the second receiving means along a second path being substantially straight; and selection means for automatically selecting either the automatic supply means or the alternative means, the selection means including means for detecting a presence of the image forming medium in the alternative means, thereby automatically deactivating the automatic supply means and automatically activating the second conveying means in response thereto.

4. The apparatus of claim 3, wherein the medium comprises a paper sheet, and the automatic supply means includes a cassette for storing a supply of the sheets, and means for feeding individual sheets from the cassette to the printing means.

5. The apparatus of claim 3, wherein the automatic supply means is deposited substantially under the priting means.

6. A data processing system for producing a visible image on an image forming medium, having a host computer for processing data and generating signals corresponding to an image to be formed on the image forming medium by an image forming unit responsive to the host computer, comprising:

automatic supply means for automatically supplying the image forming medium from a supply thereof;

first receiving means for receiving the image forming medium with the visible image;

first conveying means for conveying the image forming medium with the visible image to a first receiving means along a first path;

alternative means, provided separately from the automatic supply means, for manually supplying the image forming medium;

second receiving means for receiving the image forming medium with the visible image;

second conveying means for conveying the image forming medium with the visible image to the second receiving means along a second path being substantially straight; and selection means for automatically selecting either the automatic supply means or the alternative means, the selection means including means for detecting a presence of the image forming medium in the alternative means, thereby automatically deactivating the automatic supply means and automatically activating the second conveying means in response thereto.

* * * * *